United States Patent
Long

(12) 
(10) Patent No.: US 6,960,088 B1
(45) Date of Patent: Nov. 1, 2005

(54) METHOD FOR EVALUATING STANDARDIZED TEST RESULTS

(76) Inventor: Eliot R. Long, 366 Clinton St., Brooklyn, NY (US) 11231

( * ) Notice: Subject to any disclaimer, the term of this patent is extended or adjusted under 35 U.S.C. 154(b) by 466 days.

(21) Appl. No.: 09/649,484

(22) Filed: Aug. 28, 2000

(51) Int. Cl.[7] .................................................. G09B 3/00
(52) U.S. Cl. ........................ 434/322; 434/323; 434/350
(58) Field of Search ................................ 434/322, 323, 434/350, 118, 219

(56) References Cited

U.S. PATENT DOCUMENTS

| | | | | |
|---|---|---|---|---|
| 6,146,148 A | * | 11/2000 | Stuppy ........................ | 434/322 |
| 6,206,700 B1 | * | 3/2001 | Brown et al. ................ | 434/116 |
| 6,377,781 B1 | * | 4/2002 | Mishkin ....................... | 434/350 |
| 6,386,883 B2 | * | 5/2002 | Siefert .......................... | 434/322 |
| 6,431,875 B1 | * | 8/2002 | Elliott et al. ................. | 434/322 |

OTHER PUBLICATIONS

Gregory J. Cizek—Cheating on Tests—How to Do It, Detect It, and Prevent It, Lawrence Erlbaum Associates, Mahwah, New Jersey, pp. v–vi, 62–69, 143–145, 211–220, 233–248 (1999).

The Wonderlic ATB Quarterly Report—pp. 1–4 (1999).

Carol L. Perlman—Results of Citywide Testing Program Audit in Chicago, Annual Meeting of American Educational Research Association, Chicago, Apr. 1985, pp. 2–10.

* cited by examiner

*Primary Examiner*—Derris H. Banks
*Assistant Examiner*—John Sotomayor
(74) *Attorney, Agent, or Firm*—Brinks Hofer Gilson & Lione

(57) ABSTRACT

A method for evaluating standardized test results includes providing a set of class profiles, each indicative of performance of a respective class for a selected test on a question-by-questions basis. One or more normative profiles are generated from these class profiles, and each normative profile is indicative of expected class performance for the test on a question-by-question basis. Individual ones of the class profiles that deviate excessively from the normative profiles on a question-by-question basis are then identified and used as an indication that the test was improperly administered for the respective class.

25 Claims, 22 Drawing Sheets

METHOD FOR EVALUATING STANDARDIZED TEST RESULTS

CROSS REFERENCE TO MICROFICHE APPENDIX

This specification includes a microfiche appendix including 1 fiche and 14 frames of copyrighted material. The copyright owner reserves all rights, other than the right to make facsimile reproductions of the appendix as part of this specification.

BACKGROUND

This invention relates to methods for evaluating standardized test administrations to a population of subjects to determine whether a test was properly administered to a particular sub-group, such as a class, for example. The members of such a sub-group will most often be defined by the test administrator or proctor for the sub-group, but may also be defined by any other element common to the subjects of the sub-group and effecting test administration. The sub-group may result from a single, group-administered standardized test session or cumulatively from many single- or group-administered test sessions of the same standardized test. While the focus of the specification that follows is most often on standardized test administrations to students in school for the purpose of evaluating the quality of the test administration procedures employed by the test administrator (teacher or proctor), the focus may also be, for example, on the conditions of the classroom, or the effects of certain extra-curricular activities or other school programs.

With the increasing use of standardized tests, particularly in primary and secondary education, it has become increasingly important to monitor the manner in which standardized tests are administered. In particular, if a standardized test is administered in a non-standard way, the resulting test results may not properly indicate the abilities of the individuals taking the test. For example, if the test administrator does not settle a class properly, rushes a class near the end of a test, improperly encourages guessing near the end of a test, improperly suggests answers, or in other ways helps individuals improperly, the validity of the standardized test is jeopardized.

This problem has been recognized by Gregory J. Cizek in a recently published book entitled, *Cheating On Tests: How To Do It, Detect It, And Prevent It* (Lawrence Erlbaum Associates, Mahwah, N.J., 1999), particularly in the discussion at pages 62–69. Cizek goes on to discuss several statistical methods for detecting cheating by individual students, not misadministration of a test for an entire class.

One statistical approach to the detection of misadministration of tests is that provided by the Wonderlic ATB Quarterly Report. Each school submits information identifying each applicant who is tested, his or her total test score (number of correct answers), the number of the last question attempted by the applicant, and the program of training the applicant has applied for. This information is then used to provide a comprehensive listing of tested students and an analysis of the potential for problems in the test administration.

The Wonderlic analysis of potential problems relies on two features of the applicants' tests scores:

1. The distribution of total test scores among all applicants tested at the school for each specific program of training should show a Gaussian distribution if the tests are properly administered. Based on the number of applicants who score each possible test score, gaps in the distribution or unusually high concentrations of scores are taken as indications of misadministered tests.

2. The relationship between each applicant's total number of correct answers and the number of questions attempted (last question answered) is assessed. Generally, applicants with low test scores will attempt relatively fewer questions, while applicants with higher scores will attempt more questions. When low-scoring applicants attempt a high number of questions, it may be that the time limit for the test was not observed. When an applicant achieves a relatively high score but answers relatively few questions, the high accuracy rate is suspect, and may be an indication that the applicant received inappropriate help.

In the Wonderlic methods, the evaluation by standard deviation is primarily limited to larger groups of subjects (50 or more) while the evaluation based on the number of questions attempted is limited to tests that are time restricted, where most subjects fail to complete the test. For evaluation among school classrooms, a method is required for use with smaller groups (30 or fewer), for tests that may be completed by all students, and that is sensitive to multiple methods of improper test administration.

In spite of the approaches discussed above, a need presently exists for an improved method and system for assessing whether or nor a standardized test was administered properly.

SUMMARY

As described in detail below, the preferred embodiments of this invention include methods for evaluating standardized test results. First, a set at of sub-group (e.g. class) profiles is provided, each sub-group profile indicative of performance of a respective sub-group on a selected standardized test including multiple questions. Then, a normative profile is provided indicative of expected performance on the selected test. The sub-group profiles are then compared with the normative profile on a question by question basis, and disparities between the sub-group profiles and the normative profile are used as an indication of misadministered tests.

Because deviations of the individual sub-group profiles from the normative profile are identified on a question-by-question basis, this method effectively identifies a wide range of problems in test administration, ranging from inappropriate help to students by the test administrator, to inappropriate settling of students before a test, to inappropriate rushing of students near the end of the test.

This section has been provided by way of general introduction, and it is not intended to limit the scope of the following claims.

BRIEF DESCRIPTIONS OF THE DRAWINGS

DETAILED DESCRIPTION OF THE PRESENTLY PREFERRED EMBODIMENTS

General Discussion

An important characteristic of a well-designed test is a range of test questions that will display a range of skill development among the test takers. The content of the test questions is carefully chosen so that success or failure with each question reflects the skill being measured. Easy questions, difficult questions and questions in between are included to provide a well-founded scale of measurement. The final test form is carefully evaluated to assure its focus on appropriate content and range of difficulty level.

With this careful selection of test content, the great majority of variation in student and group performance on the test may be attributed to variation in skill development. Some portion of variation will always be due to such factors as motivation, test anxiety, and careless errors or lucky guesses. Taken together, the natural development of skill and these non-skill related, natural effects on performance vary in predictable and well-defined patterns. When other influences on test performance are introduced, they create irregular patterns that soon become detectable. The preferred embodiments described below discern these irregular patterns from the expected, normal patterns.

When a student takes a test, there should be close agreement between the student's performance on any one or a group of test questions and his or her performance on other test questions. This internal consistency is an element of test reliability. If the student has difficulty with the easy questions, it is expected that he or she will have even more difficulty with the hard questions. If the student answers a number of the easy questions wrong, he or she should answer nearly all of the difficult questions wrong. Conversely, if the hard questions are answered correctly, the easy ones should be correct as well.

Of course, any one person may make some mistakes or careless errors, and others may make a few lucky guesses. Therefore, the expected high level of internal consistency includes a moderate level of contradiction.

When a class takes a standardized test, the results provide a range of test scores and a range of performance on each question. A picture of the class performance may be created by charting the p-values for each test question. A p-value is the percent of the students who answered the question correctly. A high p-value, such as 85% or 90%, indicates an easy question where nearly all the students in the class answer it correctly. A low p-value, such as 35% or 40%, indicates the reverse, where most students have difficulty with the question, most frequently answering it incorrectly.

Figure 1:
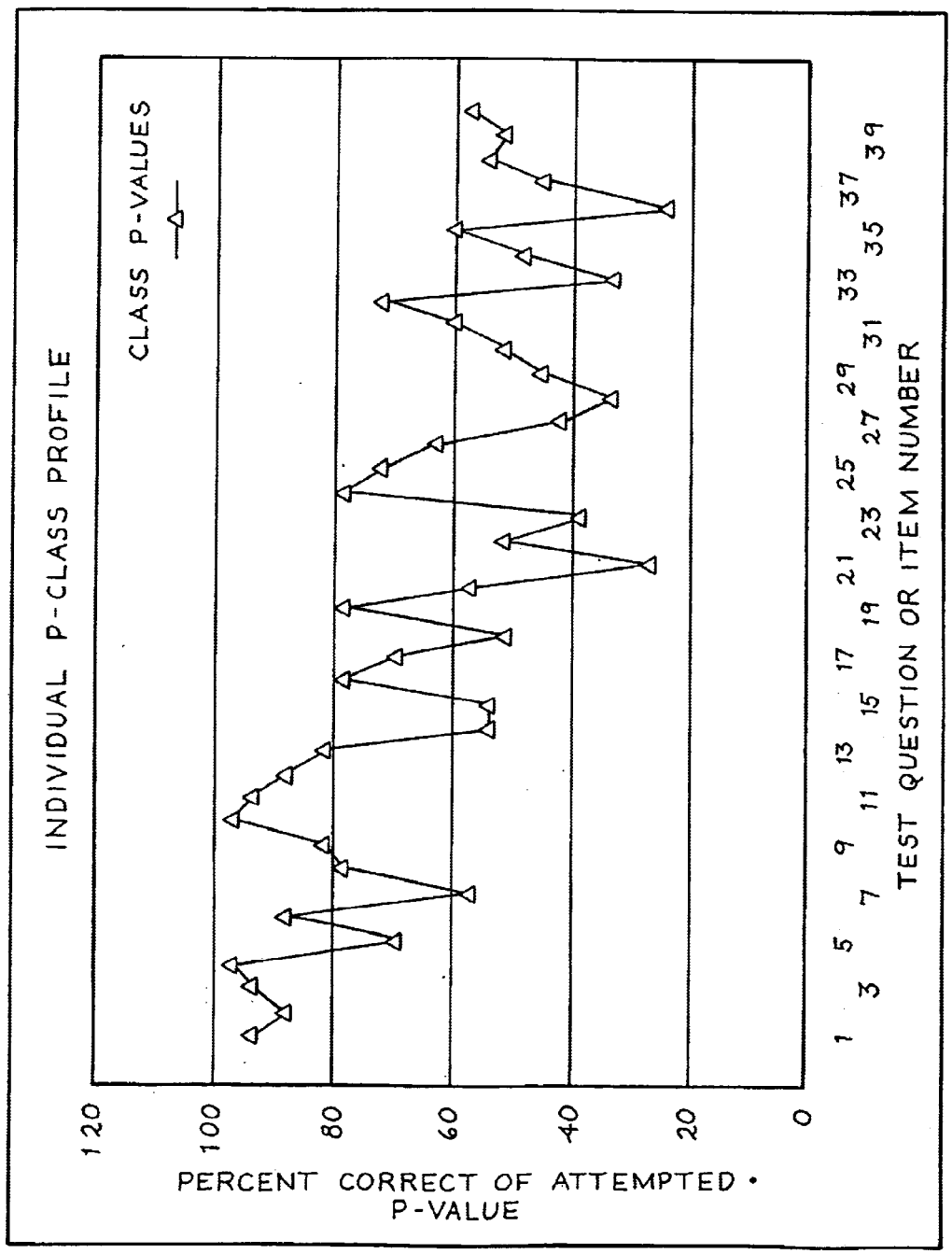
FIGS. 1–20 are p-value profiles that are described in the general discussion below with relation to various test administration conditions.

The p-value profile for students of a class indicates which test questions were relatively more difficult for the students of the class and which were easier. Taken as a whole, the profile provides a difficulty level profile. See, for example, FIG. 1, where p-value is plotted on the Y-axis and test question is plotted on the X-axis.

Figure 2:
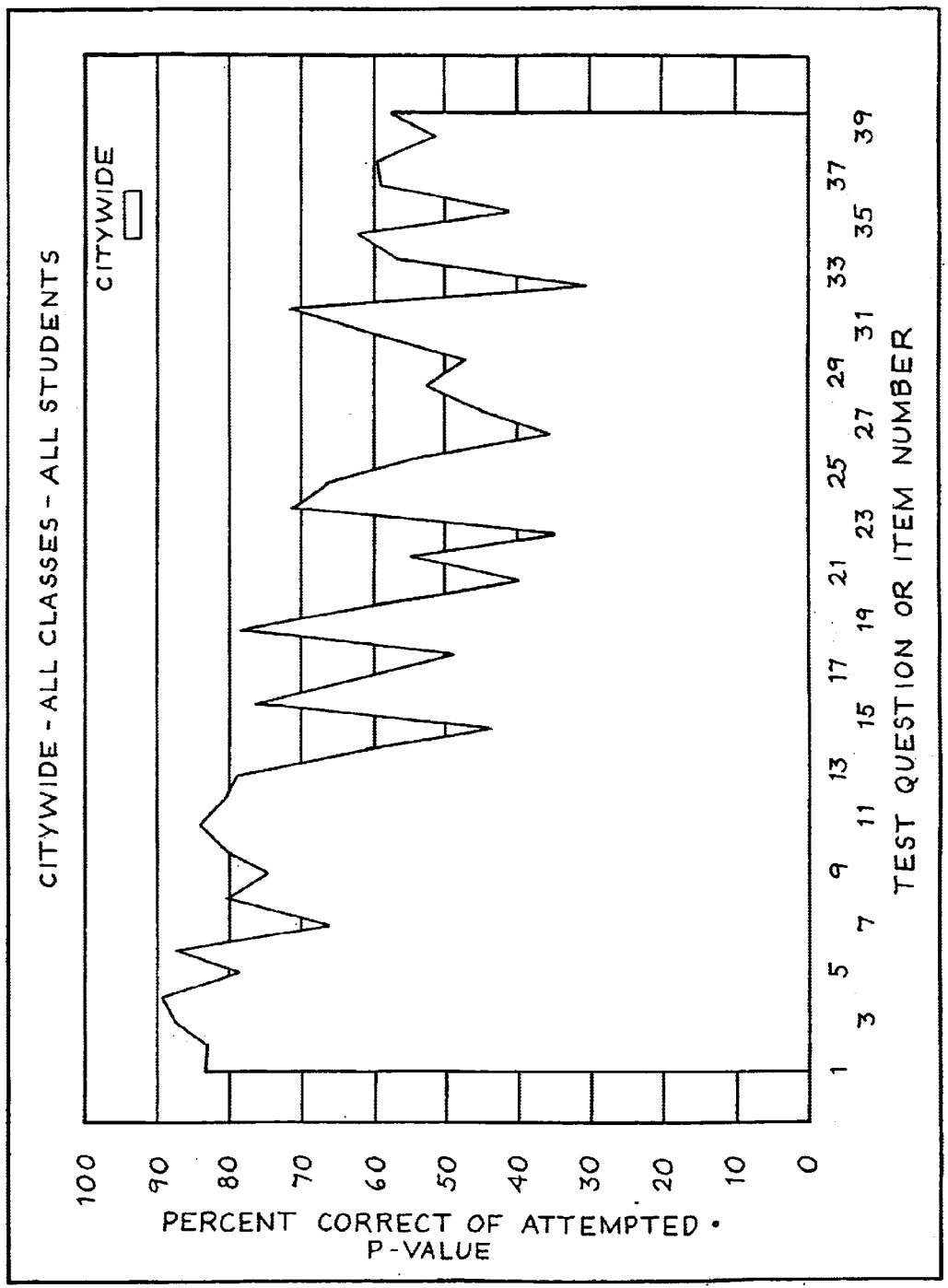

A citywide average profile may be created by calculating the percent of all students, from all classes, who answered each question correctly (see FIG. 2). The term "citywide" is used in the following discussion to refer to the entire set of classes that took the same test. Of course, any suitable group of classes can be used, whether or not they are located in a single city. This profile represents the average p-value, showing which test questions are generally the easiest and which are the most difficult, and is an example of a normative profile.

Because all questions within the test are based on the same underlying skill, students at any skill level are expected to perform relatively the same on all test questions that have the same p-value. High-skill students, for example, who perform very well on some easy questions, should perform very well on all easy questions. Low-skill students who perform poorly on some difficult questions, should perform poorly on all difficult questions.

The relative difficulty level of the test questions established by the citywide profile, then, provides a basis to evaluate the performance of students in each individual class setting. Individual class p-value profiles may be contrasted to the citywide p-value profile to evaluate the class general skill level and consistency in performance across all test questions.

The plot for both the citywide results and individual class results may be presented together to provide a comparison of the relative success of the class with respect to the citywide average. For this combined plot, we present the citywide p-values as a shaded area, where the top edge of the area represents the citywide values. For higher-skilled classes, the class plot, or profile, will be above the shaded area of the citywide values. For lower-skilled classes, the class plot will appear within the shaded area, below the citywide values.

Figure 3:
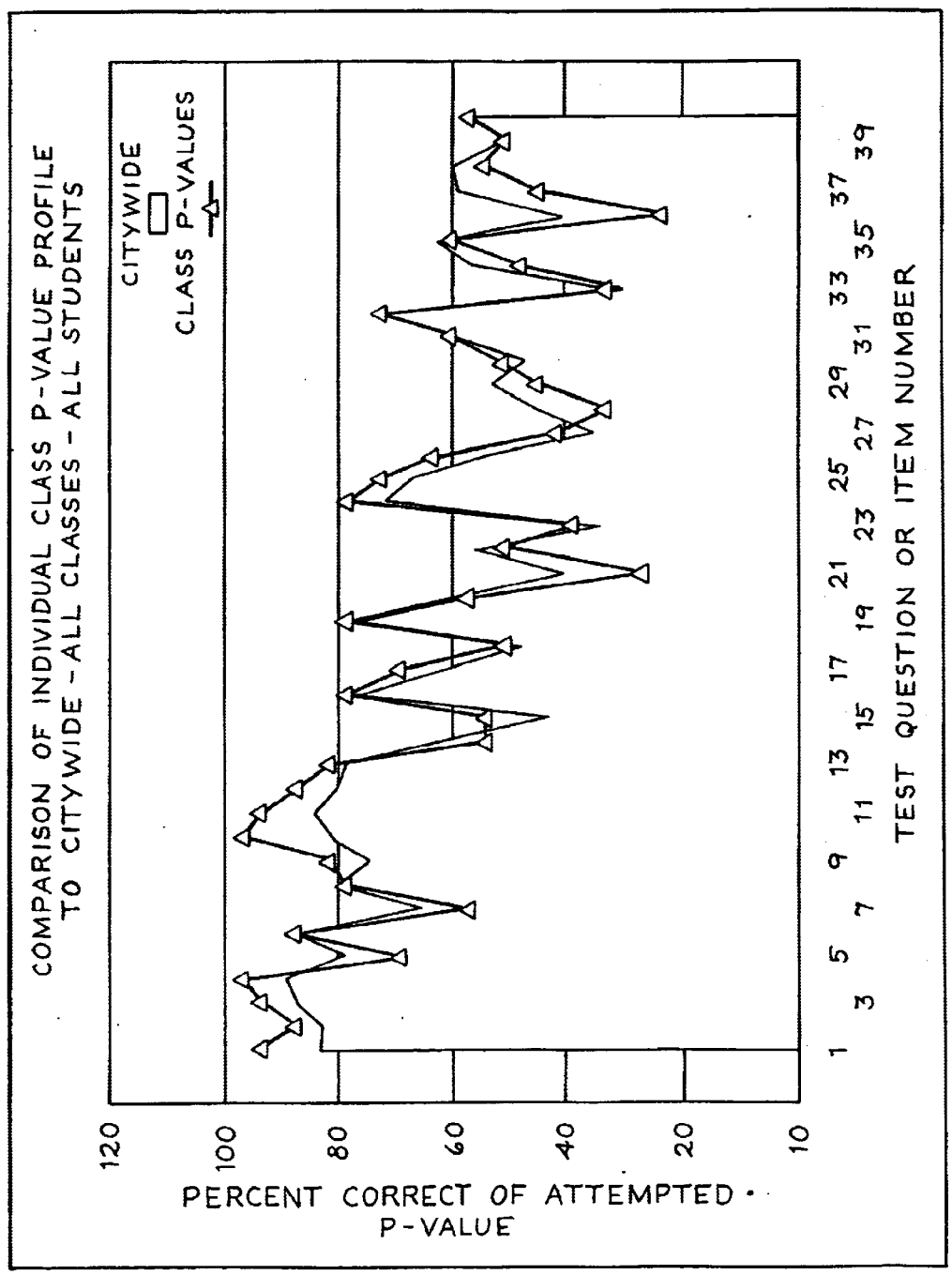
Figure 4:
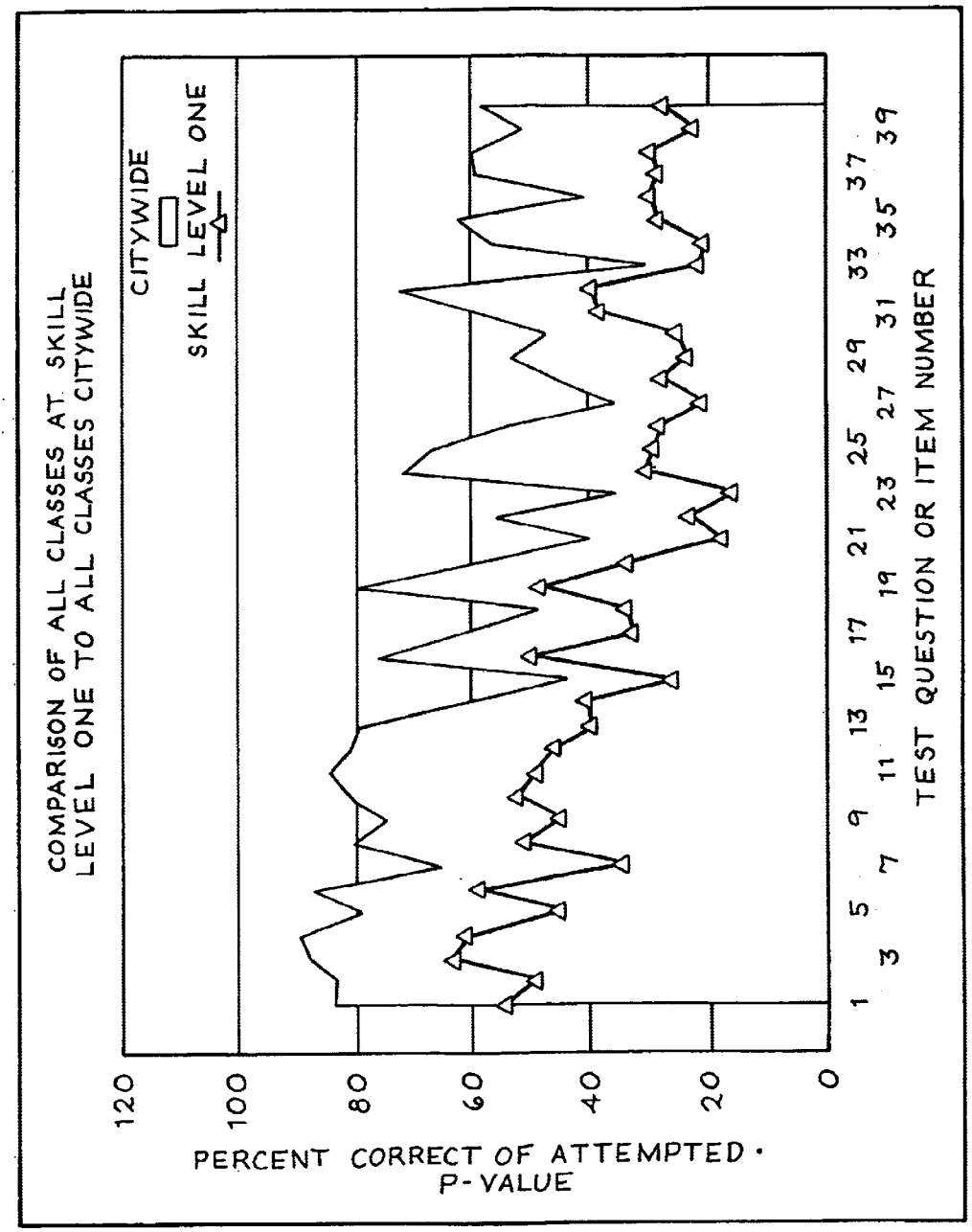
Figure 5:
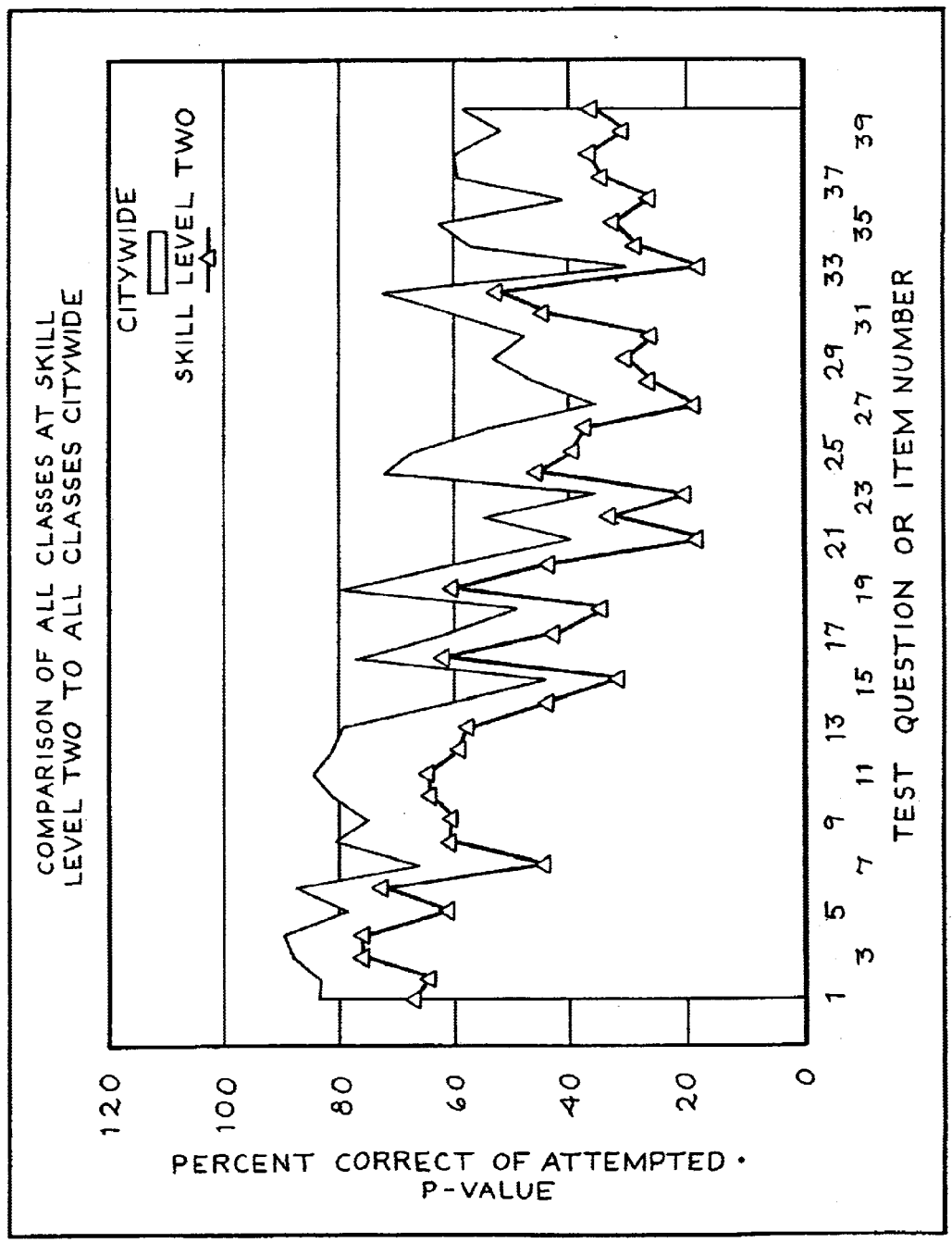
Figure 6:
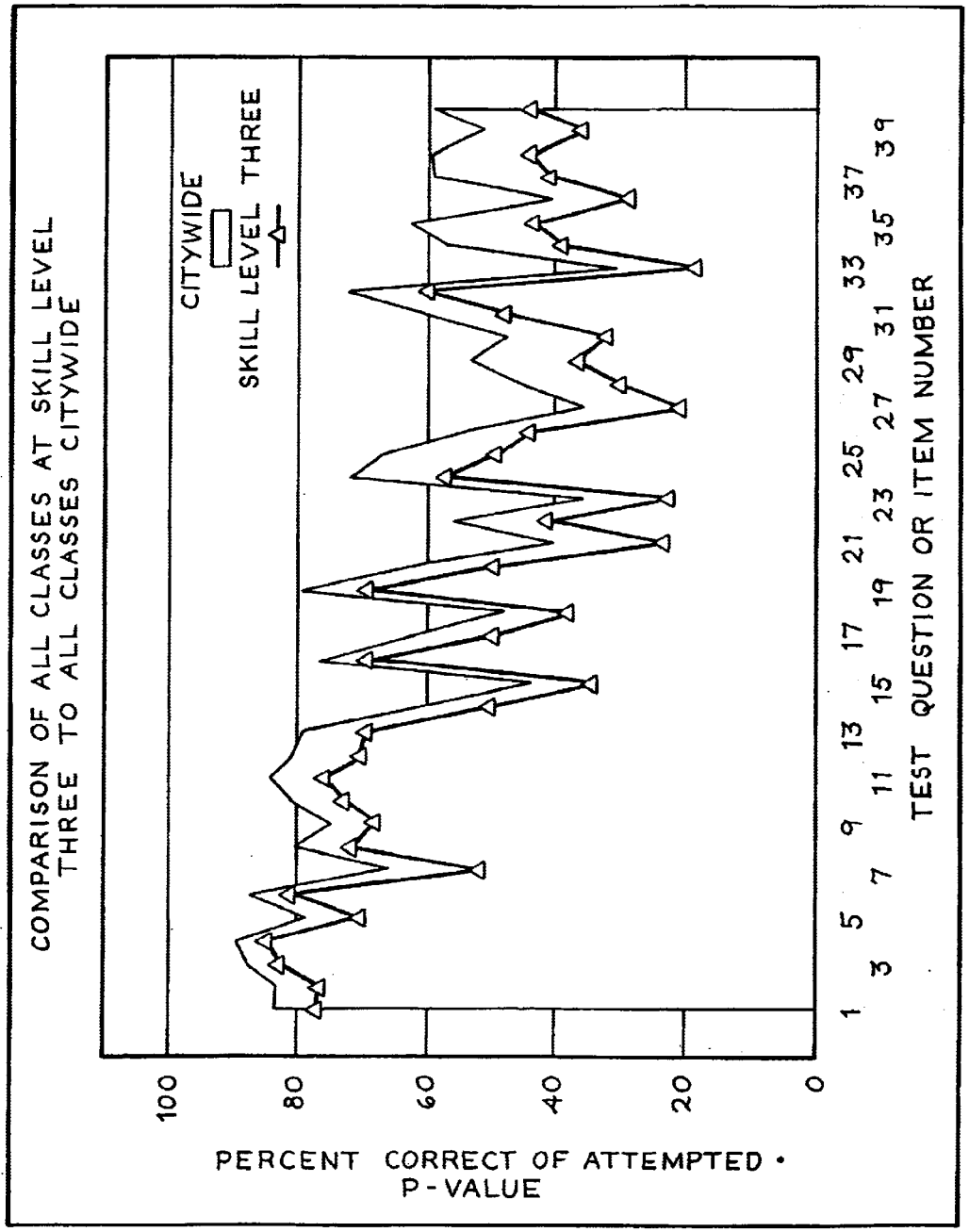
Figure 7:
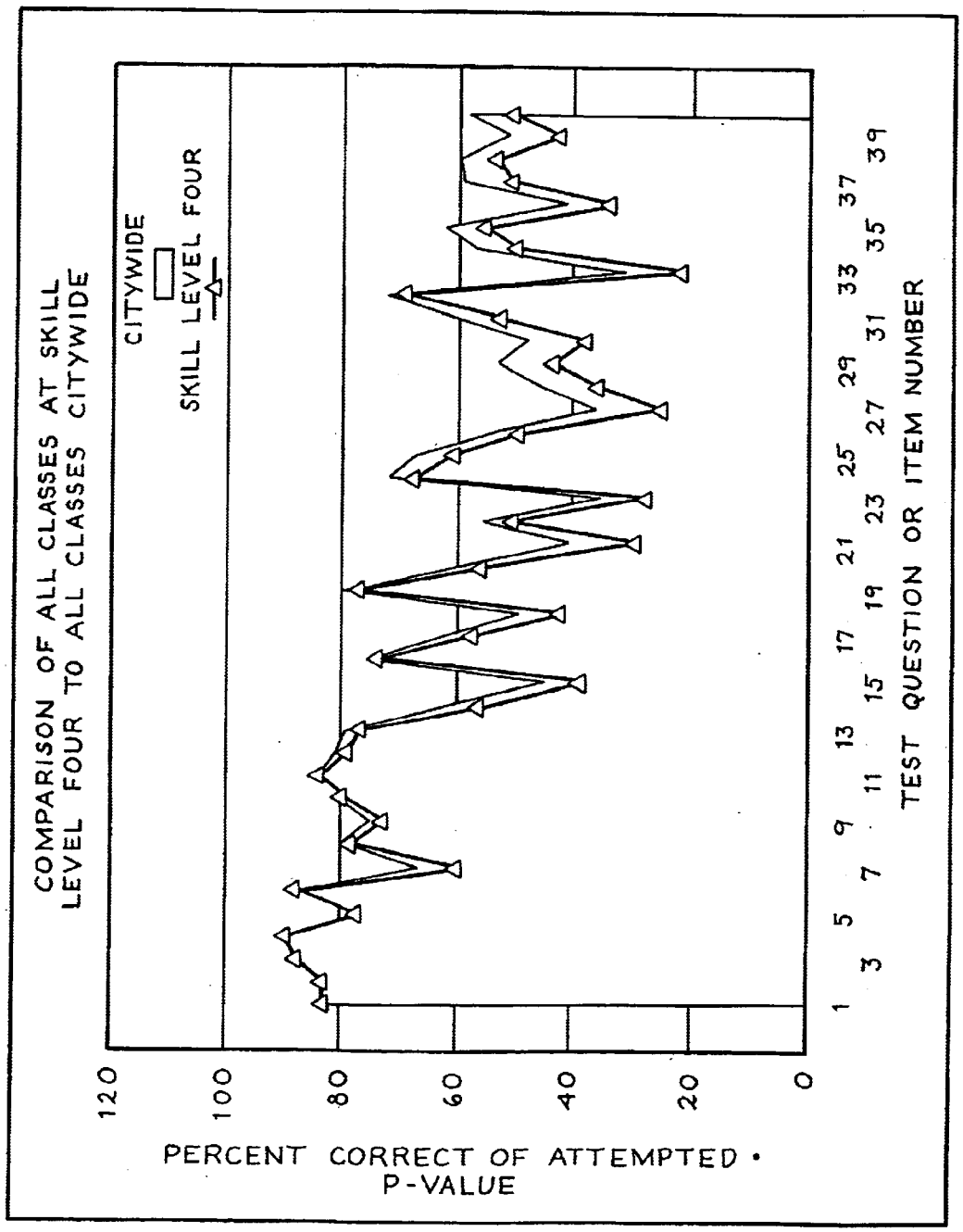
Figure 8:
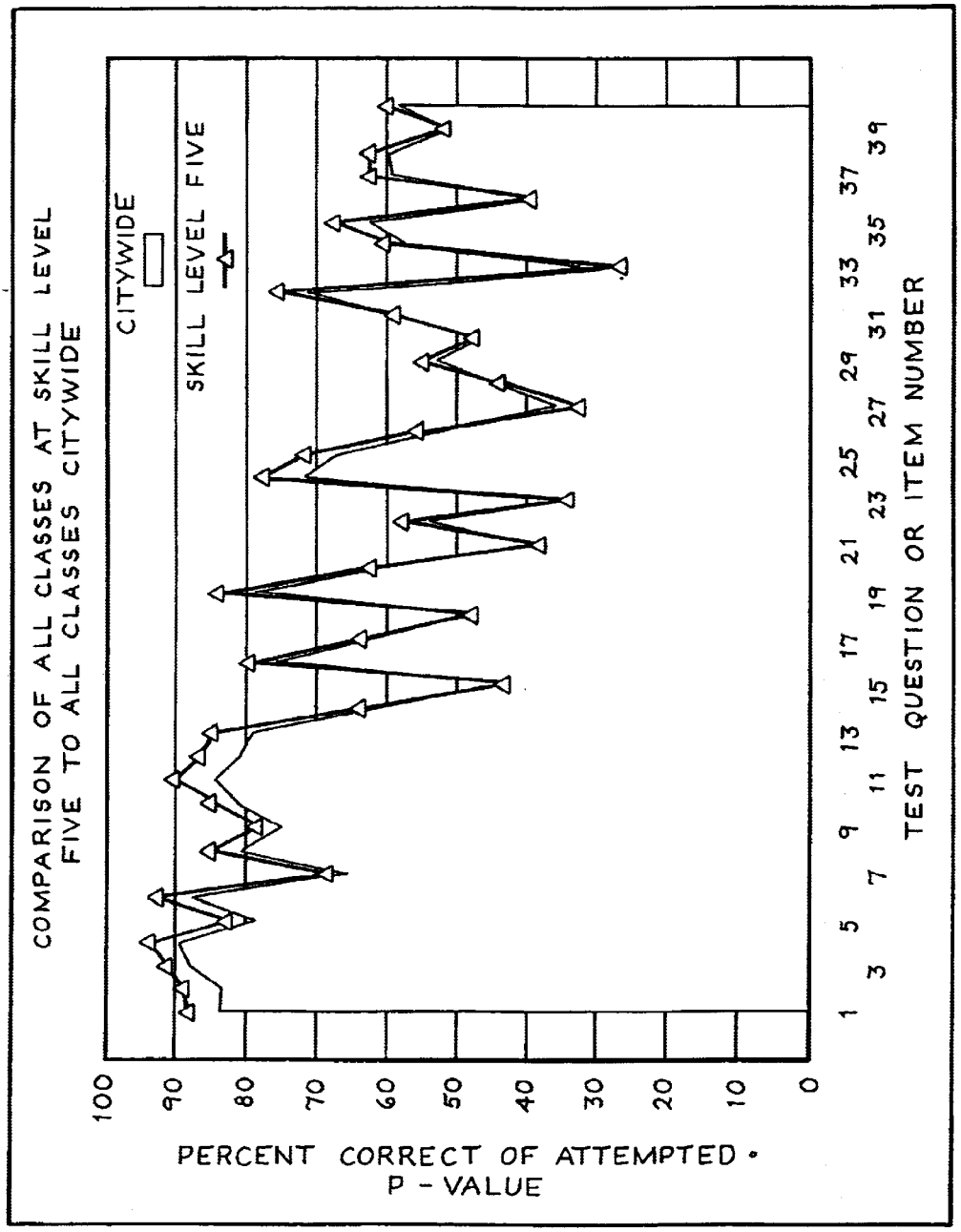
Figure 9:
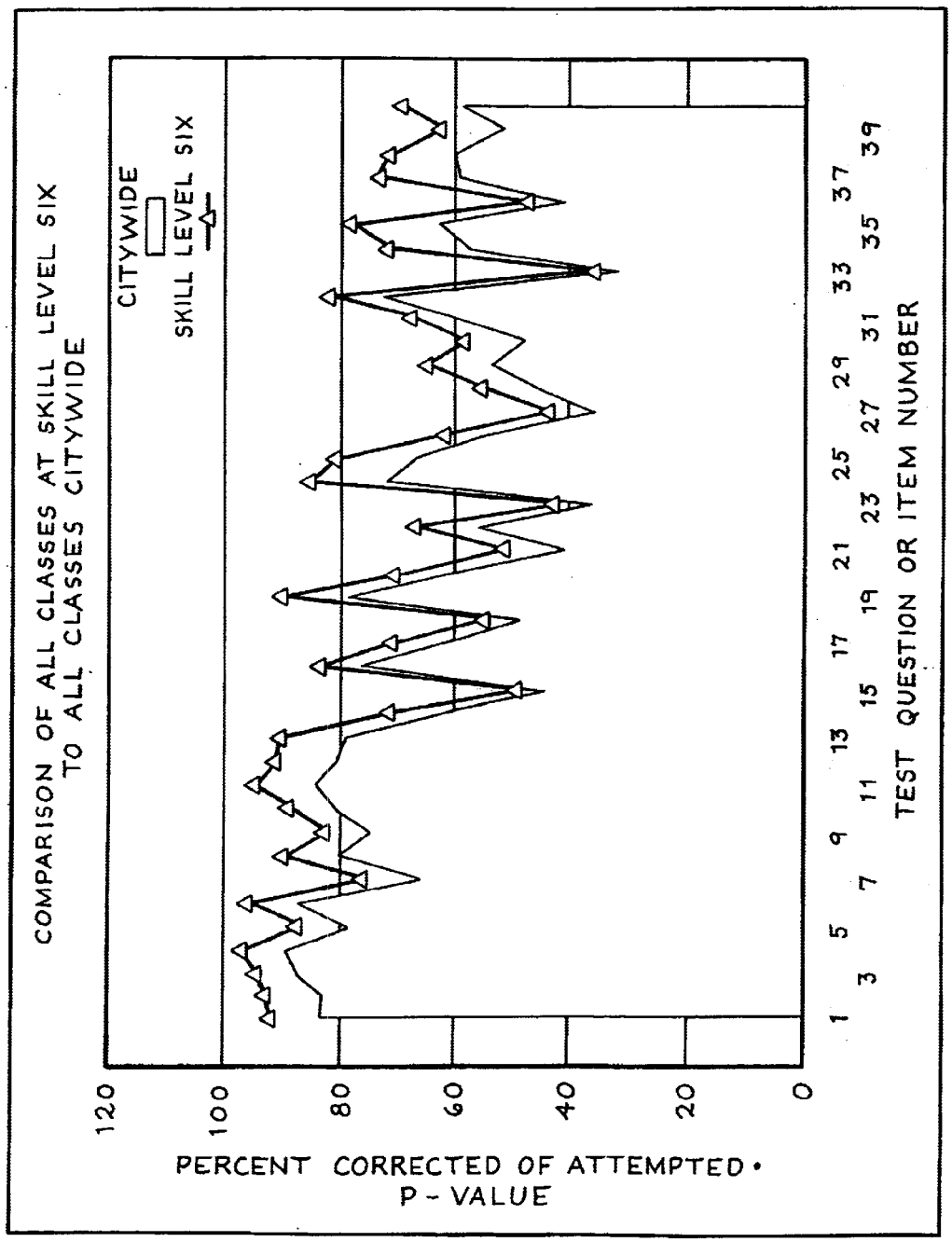
Figure 10:
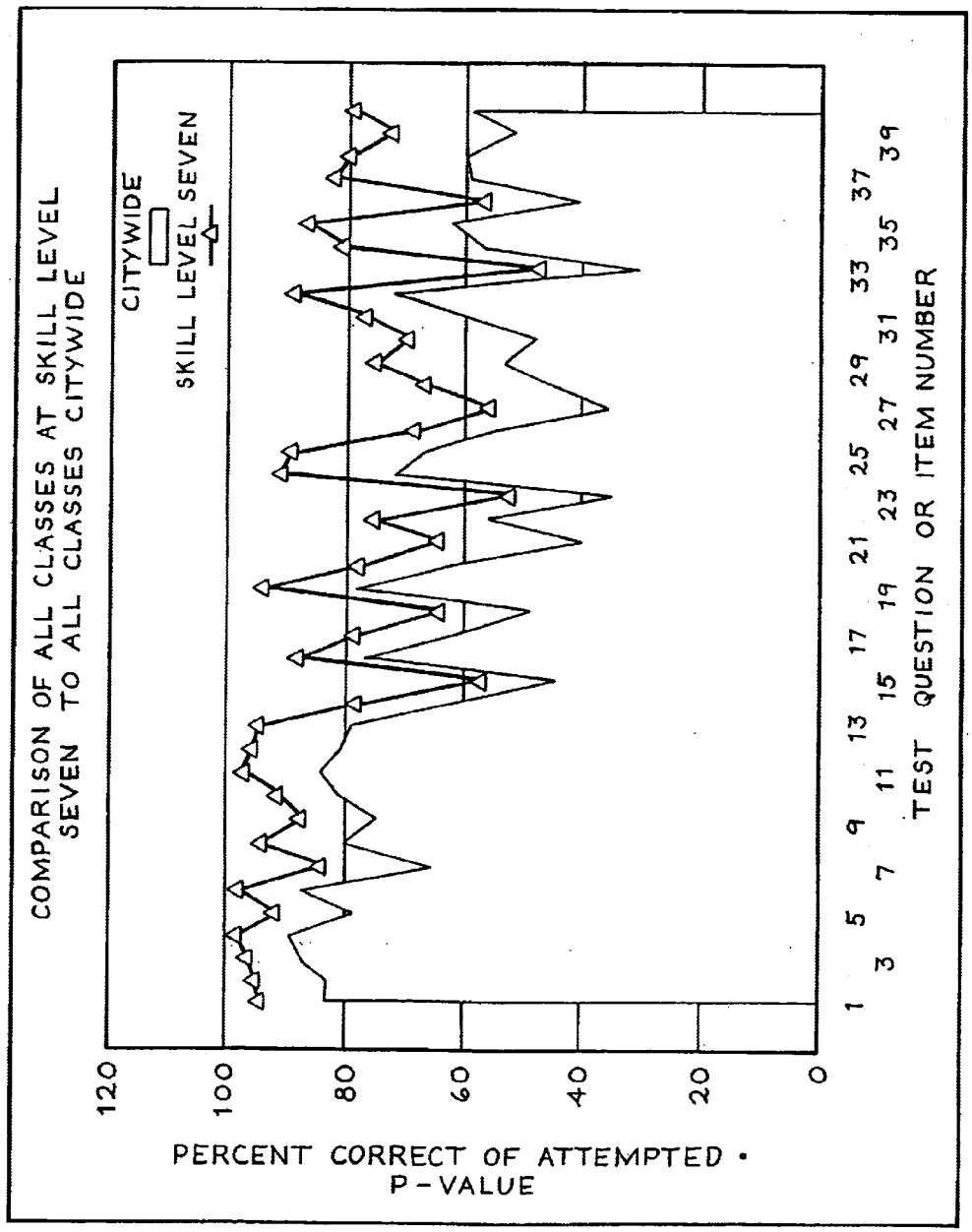
Figure 11:
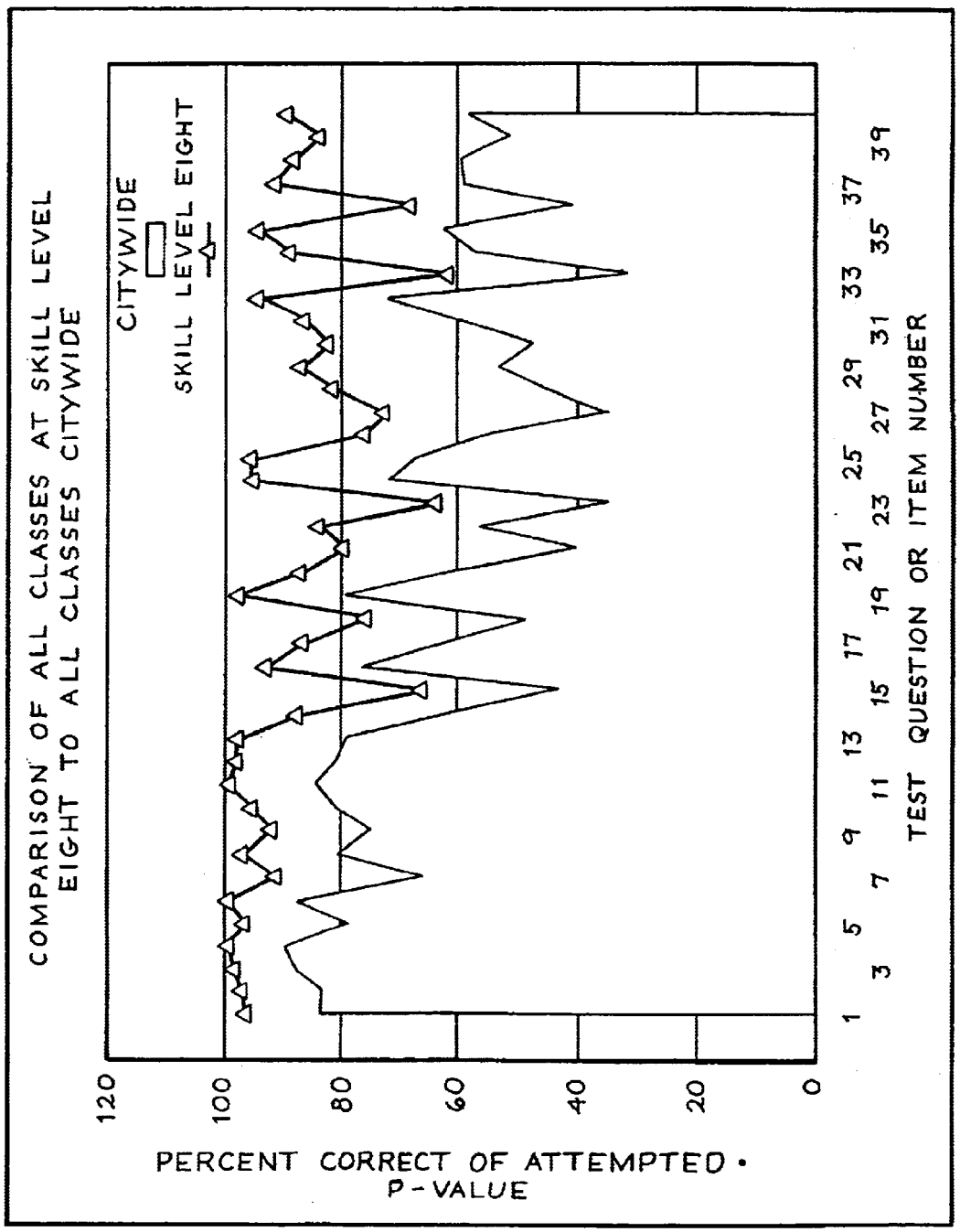

In FIG. 3, both the class average raw score and the citywide average are very close, and therefore it is not surprising that the class profile and citywide profile match very closely in FIG. 3. This comparison reveals that the class performs modestly better on some of the questions and modestly less well on other questions. Except for a few questions, the differences between the class and citywide p-values may all be accounted for by only a few extra students answering an individual question correctly or incorrectly. This degree of variation is expected, and it may therefore be assumed with a high level of confidence that the test administration closely followed the required test procedures and that the students' scores fairly represent their skill.

For a further refinement, we may group classes with similar average test scores and create a normative p-value profile that represents the average of all classes with the same average skill level. Additional profiles may be created for groups of classes with higher and lower average scores. A comparison of these profiles reveals the changes in individual test question p-values (or difficulty level) and in normative p-value profiles with the increasing skill level of the class.

This is illustrated in FIGS. 4–11, which present p-value profiles for eight groups of classes, each having a different skill level. These figures illustrate an important characteristic of skill gain: the consistency of the relationship between the more easy (higher p-value) and more difficult (lower p-value) test questions, even as the general skill level increases and all p-values increase. Further, skill gains are reflected rather uniformly across all test content, as opposed to at specific test sections or questions. These relationships reflect natural skill development. When the test is improperly administered, the relationship breaks down and the class p-value profile deviates from the normative profile.

This comparison of the class p-value profile against class average profiles (by skill level) confirms the sound design of the test and the generalization of the skill being measured. As the skill level of the classes increases, there is a general improvement across all test content, and the p-values of both difficult and easy questions increase. Skill improvement is not dependent on specific sections of the test or on specific types of questions.

Irregular Response Patterns

The p-value profiles presented in FIGS. 4–11 confirm the essential characteristics of the test content and provide standards against which individual classes may be measured and evaluated. This measurement may take many different forms, each reflecting an emphasis on a different characteristic of student and class test performance. These measurements include a correlation of class to citywide p-value profiles, a correlation of class to appropriate skill level p-value profiles, measures of the class test score distributions, including standard deviation and frequency at the mode, and several specially-developed measures for extreme item p-values, range in skill differentiation, and isolated ranges of exceptional skill performance.

To support the evaluation, each measurement is applied to all classes under review and the results are subjected to a normative analysis. This normative analysis determines the range and concentration of the measurement values among all classes, and the degree that measurement variation is dependent on class average score or class size. The normative analysis indicates the range of expected measurement values and provides a method for isolating classes based on their extreme position relative to the norm.

Classes with exceptionally high or low skill levels represent situations where there is little variance in performance among the students or within the test. For this reason, these classes may be excluded from the review, if desired.

P-Value Profile Correlations (Test 1)

P-value profile correlations (e.g., Pearson linear correlations) provide an evaluation of the degree to which the students in each class experience the same relative difficulty or ease among the test questions as found in the citywide p-value profile and, more particularly, in the normative profile of all classes at the skill level represented by the class average test score. When, for example, the students correctly answer relatively more difficult questions more frequently than relatively easier questions, a low correlation coefficient results.

The frequency of correlations of each magnitude among all classes is determined during the normative analysis. Classes with rarely occurring, low correlations are identified for further review. One type of improper influence indicated by low p-value correlations is assistance with the more difficult test questions.

Class Test Score Standard Deviation (Test 2)

The class test score standard deviation is a measure of the dispersion of test scores, and therefore skill level, among the students within the class. Because the great majority of classes are made up of freely associated students (no one class subject to special entrance requirements not true of the other classes), the standard deviation will be relatively the same for all classes at similar class average skill levels.

When lower skill students are improperly assisted during the test administration, their scores will increase while those of the remaining students will not. This influence will result in a markedly smaller standard deviation of the class test scores. Conversely, when the lowest skill students are allowed to fail, while modest skill students are improperly assisted, the class standard deviation will become markedly larger. For these reasons, either exceptionally small or exceptionally large standard deviations are cause for further review of the class. The normative analysis identifies the level at which the standard deviation becomes exceptional.

P-Value Difference (Test 3)

As mentioned above, natural skill development results in a difference in student performance on the more easy test questions as compared to the more difficult questions. When the test administration is improperly influenced, the magnitude of this difference or the consistency of the difference throughout the test content is affected.

A measurement of this difference is calculated by averaging the p-values of the most difficult test questions and, separately, averaging the p-values for questions that are moderately easy. Selected questions are picked for these two groups of test questions, chosen so that they are distinctly different in difficultly level, but also so that both groups have the opportunity to move up or down with skill level. In a test of 40 questions, 10 difficult and 10 relatively easy items may be used, for example.

The difference between the p-value averages for these two sets of questions provides a measure of the students' skills applied to the material on the test. A small p-value difference is expected at the very low and very high skill levels. Among very low-skill students, all the questions are difficult and all have low p-values. Among very high-skill students, all the questions are relatively easy and all have more uniformly high p-values. For the great majority of students, and over the most important range of test scores, there is a substantial p-value difference that is relatively consistent. This consistency is due to the fact that as students improve their performance on the easier questions, they also improve their performance on the more difficult questions.

The normative analysis provides both a reassurance of the relationship between the p-value difference and class skill level and a clear identification of the points at which p-value differences become exceptionally large or small. As with the class standard deviation, either too large or too small a p-value difference is an indication of potentially improper test administration.

Figure 12:
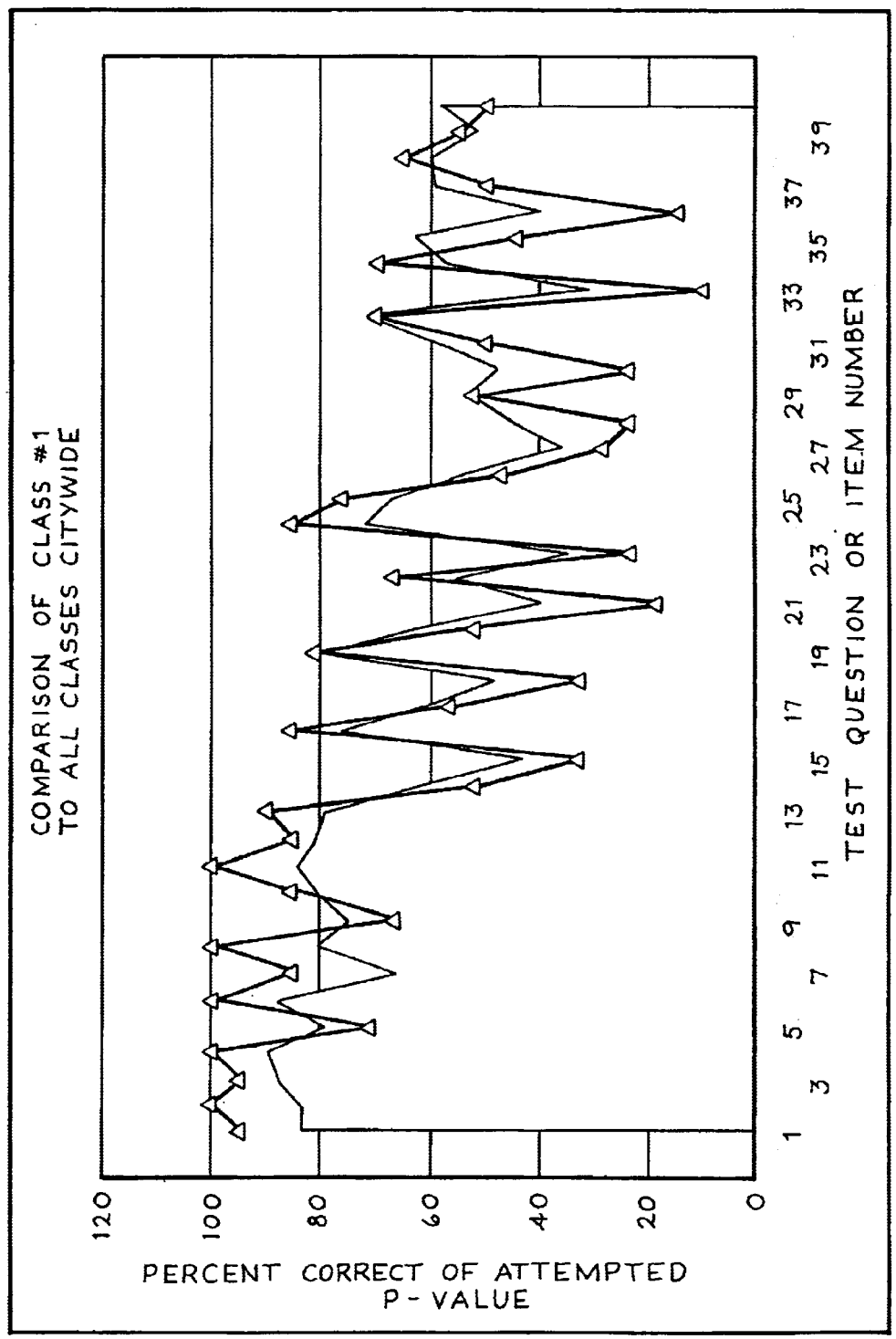
Figure 13:
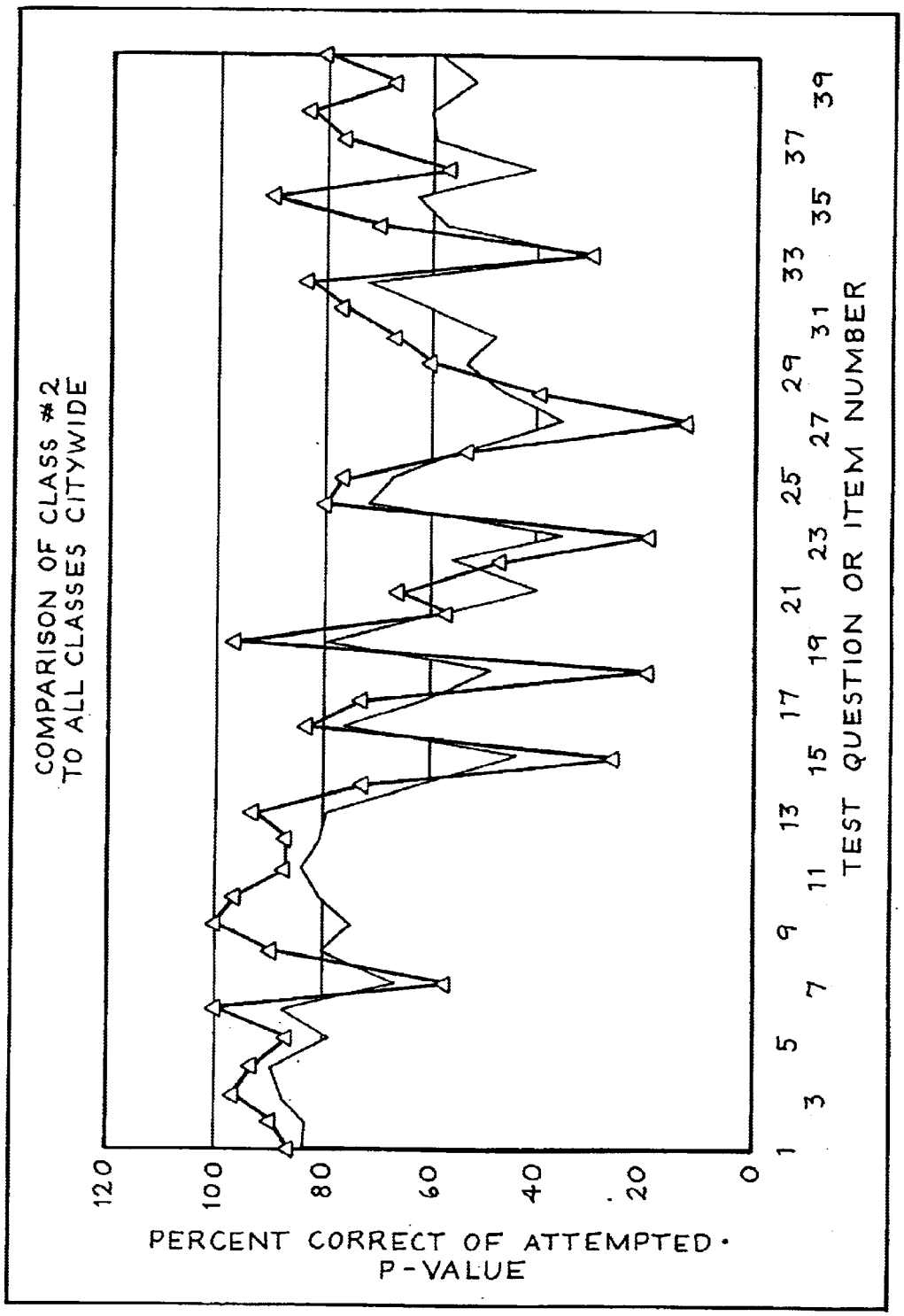
Figure 14:
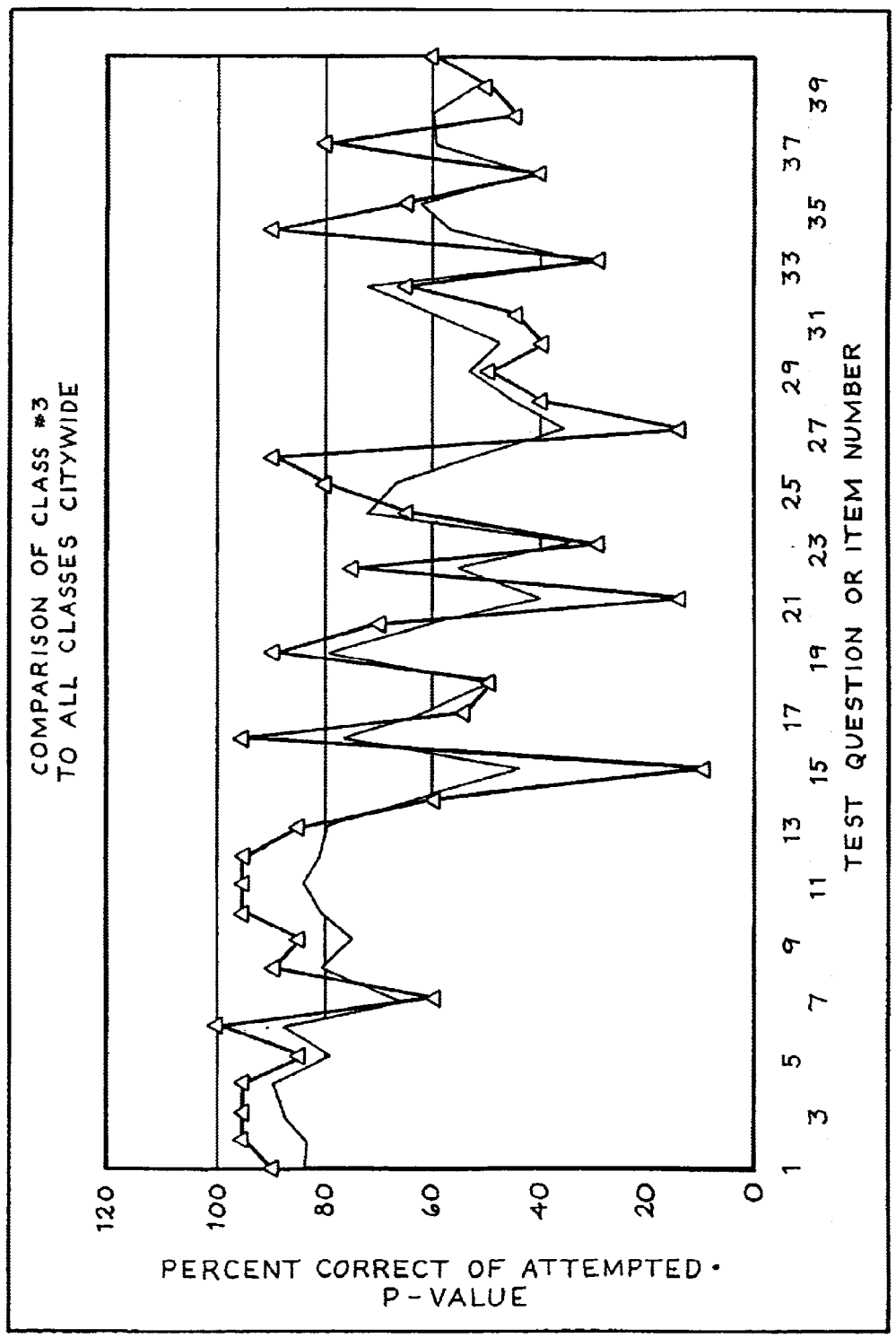

Large p-value differences most frequently reflect improper assistance with the easier test questions while allowing the students to struggle with the more difficult questions (see FIGS. 12–14). The higher p-values recorded on the less difficult test questions by the classes plotted in these figures would indicate a higher skill level than that actually achieved according to class average score. At the same time, the lower p-values recorded on the more difficult test questions would indicate a lower skill level than the class average score. These p-value profiles are suggestive of inappropriate assistance with the easier test questions but not the more difficult questions.

Figure 15:
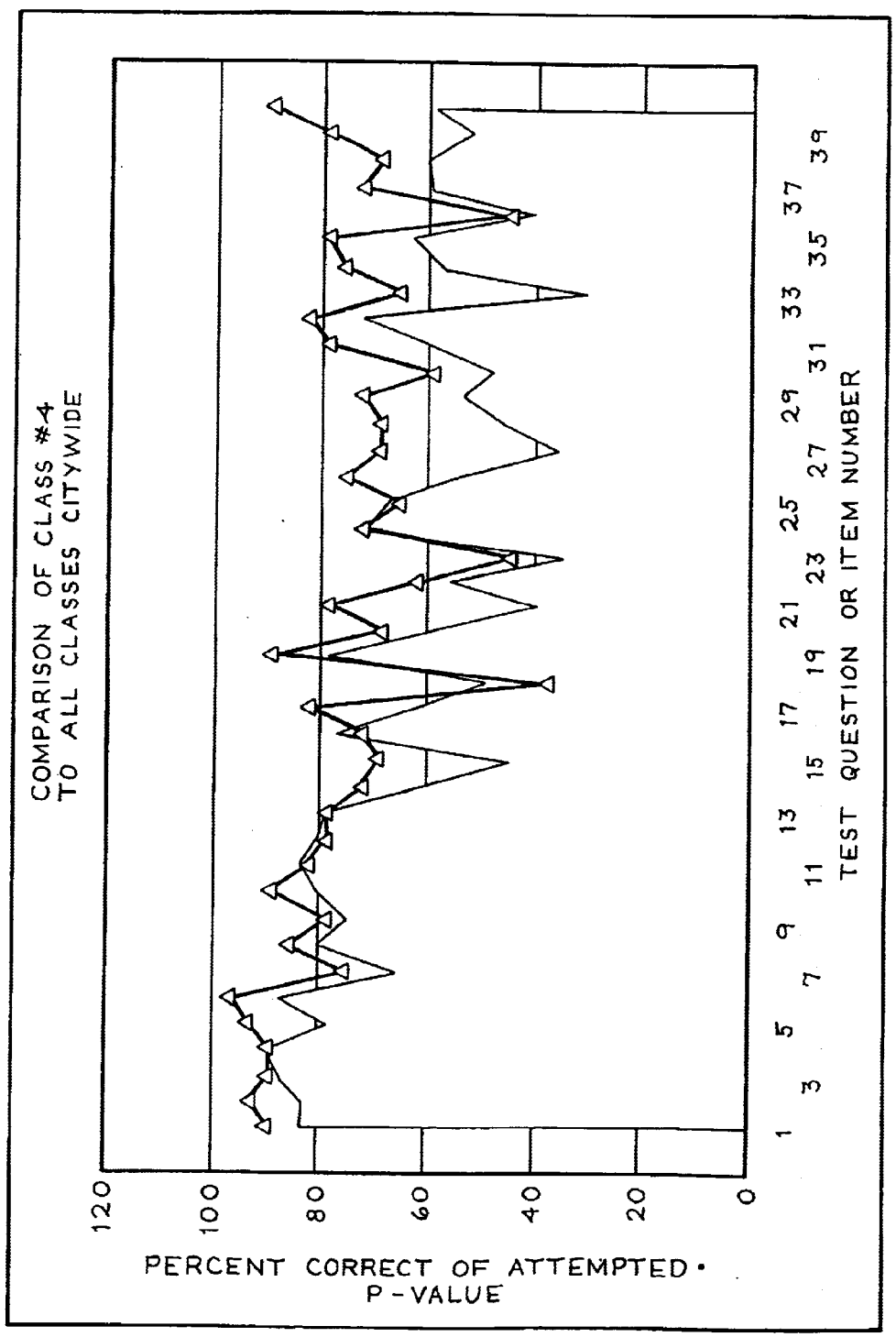
Figure 16:
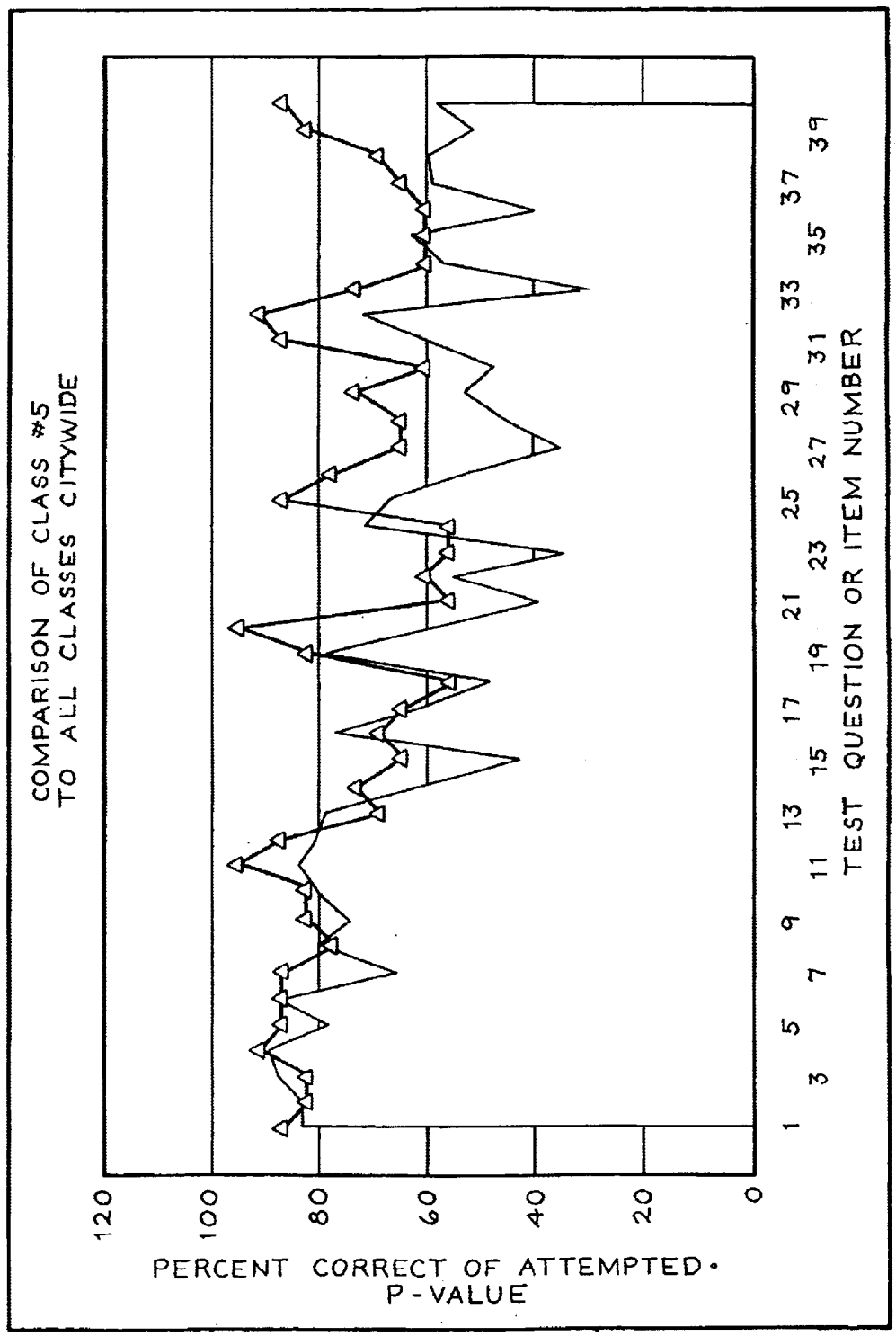
Figure 17:
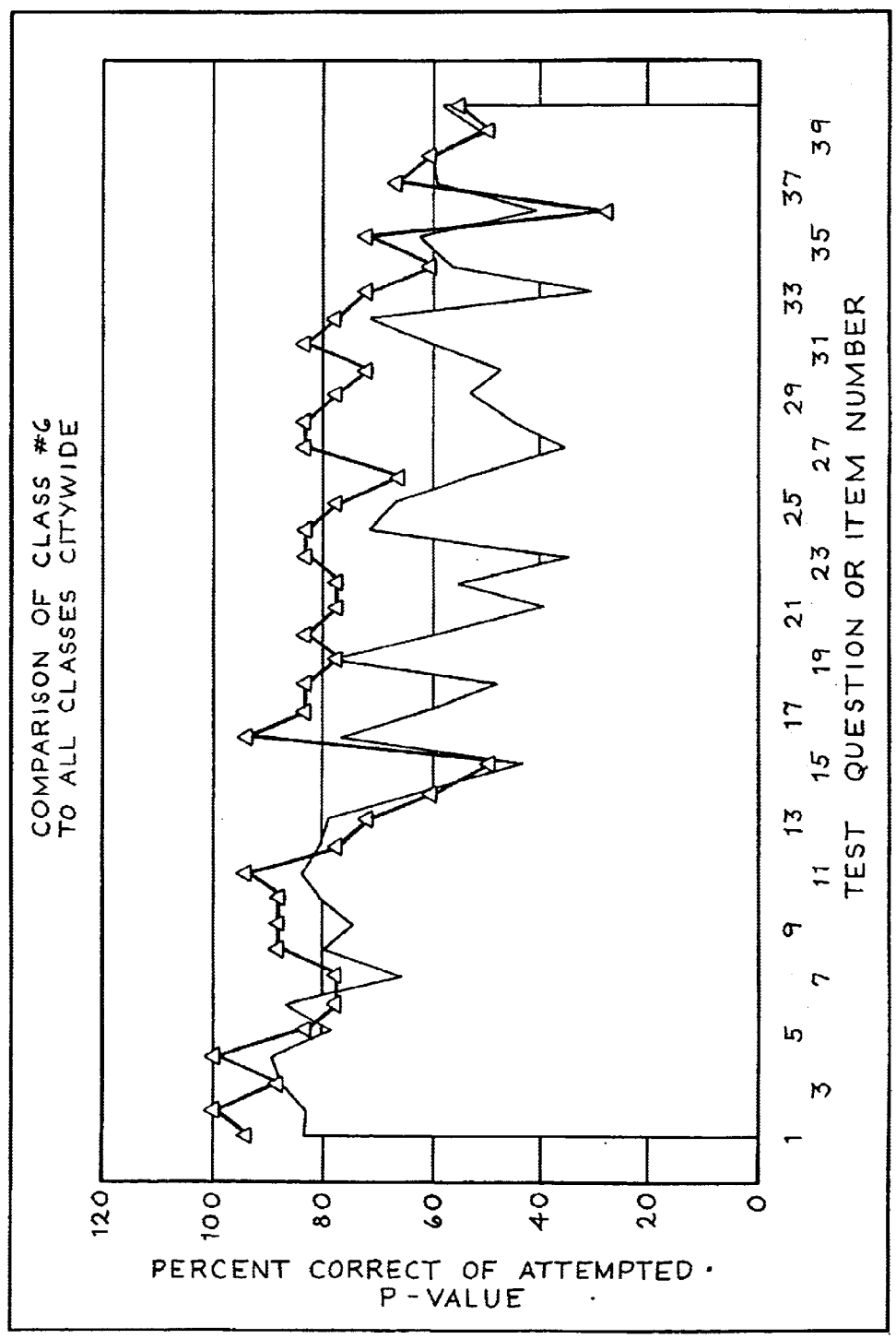

Small p-value differences indicate either assistance with the more difficult questions or whole-test manipulation. When a class average difference between the easy and the difficult item p-values is small, as in FIGS. 15–17, there is a conflict in the test interpretation: If the class skill level is not sufficiently high to do better with the easy items, why is the class so successful with the difficult items? Conversely, if the class is so skillful as to achieve relatively high success with the difficult items, why hasn't it been more successful with the easy items?

Extreme Test Question P-Values (Test 4)

The natural progress of skill development leads to higher p-values for all the test questions. When the test proctor, however, provides improper assistance with specific test answers, the p-values for those questions will become excessively high in relation to the skill level indicated by the class average score. Of course, any class may coincidently perform exceptionally well on any one test question. When too many of the question p-values are exceptional, improper assistance is indicated.

A measure for determining exceptional p-values is provided by measuring the p-value variation among large groups of classes with similar class average test scores. This variation, determined separately for each skill level, reflects the normal variation due to incidental factors. The p-value for each test question for each individual class is then evaluated by the size of the difference between the class p-value and the normal p-value for the same question as determined by classes at the same skill level (see FIGS. 4–11). The difference between the class and average p-value for the question is divided by the standard deviation of all class p-values to yield a z score.

The z score may be directly interpreted to indicate the likelihood of any one test question having that large (or small) a p-value when a group of students of that skill level is tested. This likelihood may be applied to the number of questions in the test to determine the number of questions that are likely to arise with any given z score. In one example, z scores of 2.0 and 1.5 are selected (which translate to 1 and 5 test questions, respectively, for the entire test). The normative analysis confirmed the frequency of the occurrence of p-values at these extremes and set the critical points to identify potential improper test administrations.

Isolated Range of Exceptional Performance (Test 5)

A suggested method of improper influence on the test administration is coaching or special instruction on a specific area of test content. Such an influence would elevate the p-values for the specific area of the test as compared to the remainder of the test content. The p-value profiles of FIGS. 18–20 indicate this condition.

Figure 18:
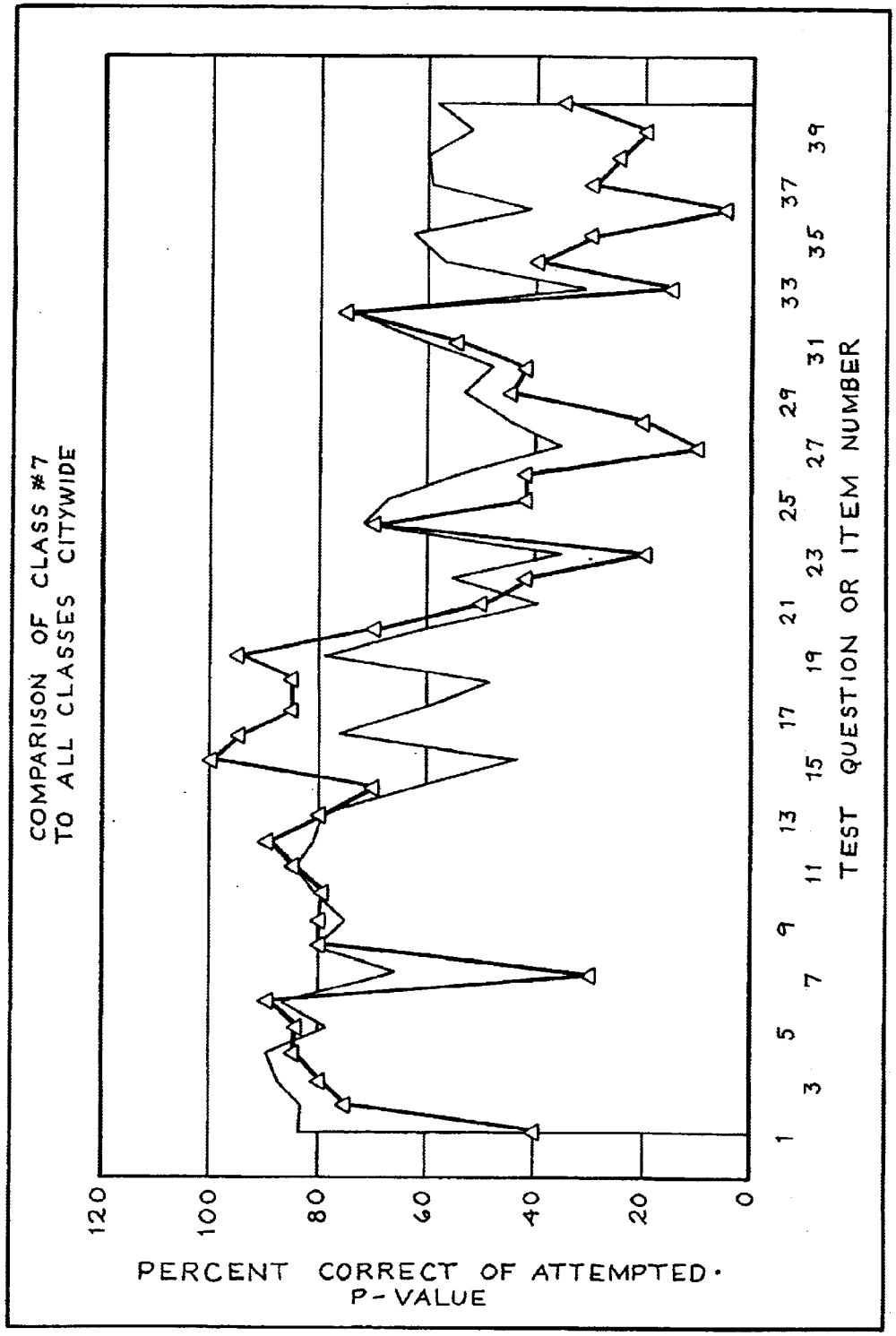
Figure 19:
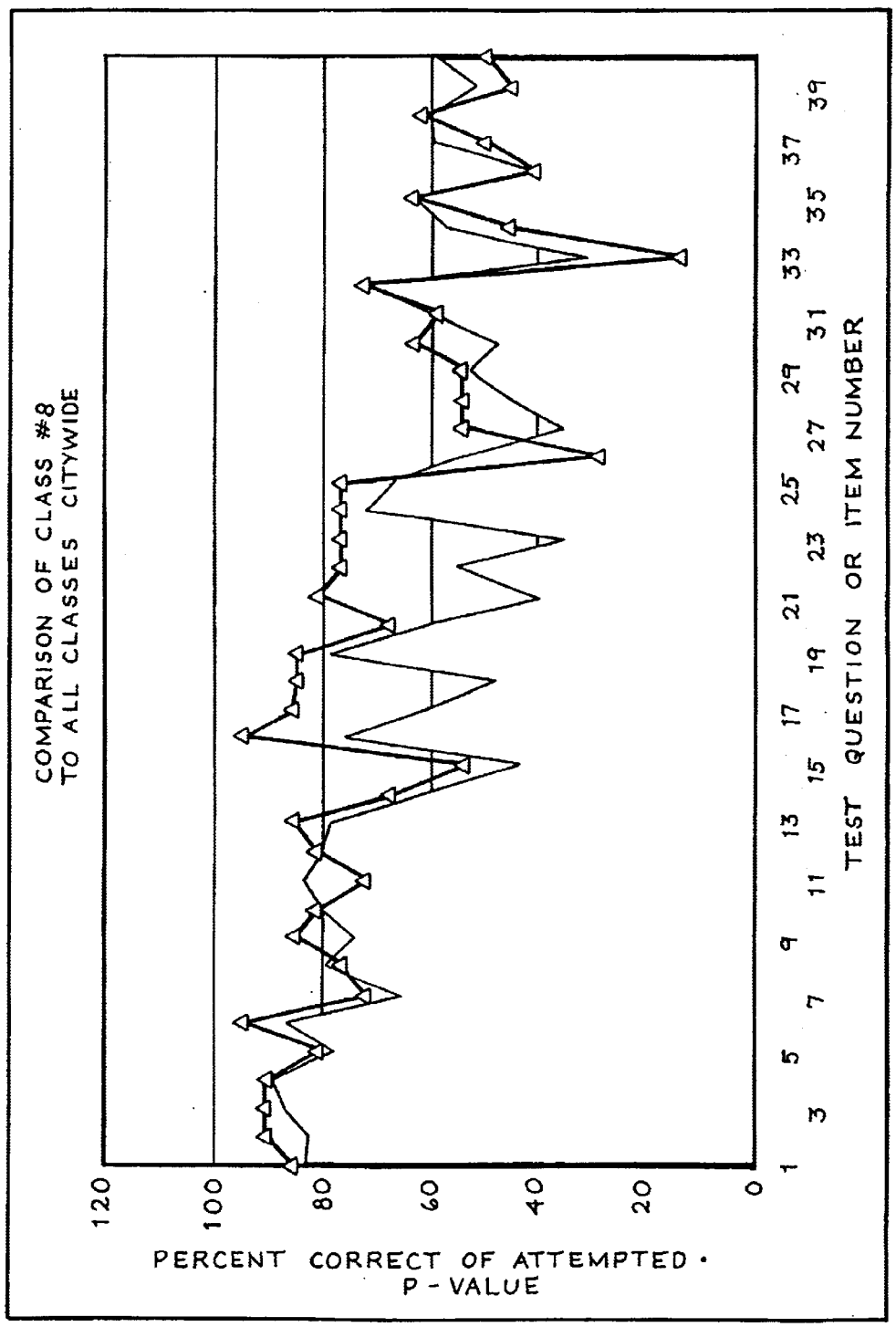
Figure 20:
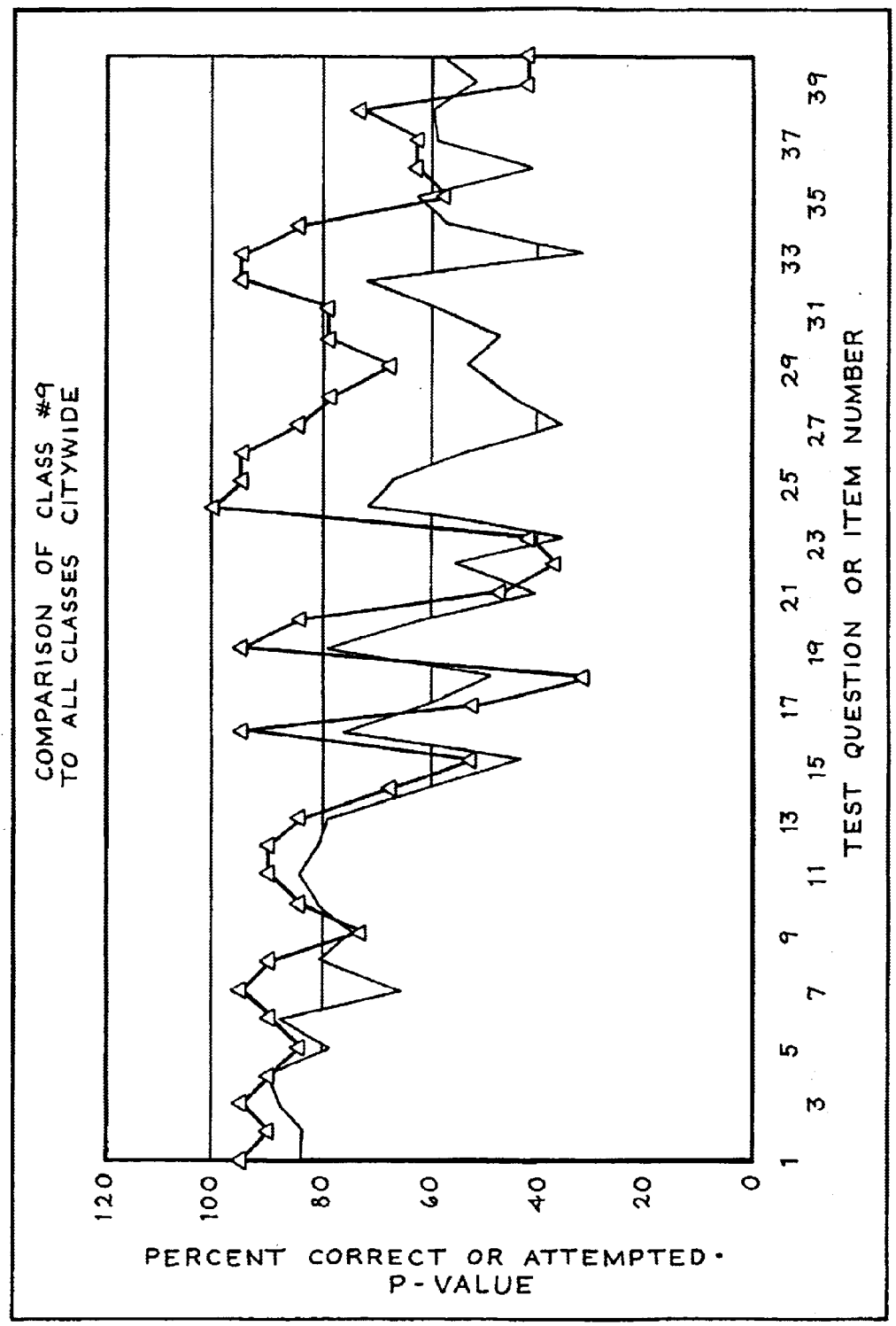

Higher skills are most often demonstrated by a class p-value profile that is consistently above the established profile for the citywide average, throughout the test content. In the examples of FIGS. 18–20, each class demonstrates higher skill (higher p-values) through a limited section of the test, while demonstrating average or lower skills on the remainder of the test content. This pattern is consistent with special instruction related to specific test content.

A measurement for this condition is provided by calculating the difference between the class and citywide p-values for each question, creating a moving average difference for every 10 successive questions, and then measuring the difference between the largest and smallest moving average value over the test content. If the class performance is relatively lower, the same as, or relatively higher than the citywide performance, but nevertheless consistently so, this measurement will be small and ideally zero.

The normative analysis provides an expected value and identifies the level at which exceptional irregularities occur.

Successive Equal P-Values (Test 6)

An analysis was made of the frequency that successive, equal p-values occurred; successive doubles, triples, and quadruples. This analysis clarified not only the rarity of successive equal p-values, but the consistency that such cases also involved other exceptional response patterns.

Identical Item Response Strings (Test 7)

An identical response string occurs when two or more students not only answer the same items correctly, but also select the same choice of alternative answers for those answers that are wrong. In a review for the U.S. Department of Education 'Ability-to-Benefit' program, this type of analysis was successful in identifying several instances where the proctor had prepared the answer sheets in advance and then substituted them for the students' answer sheets.

Scoring Irregular Response Patterns

The normative analysis of the entire set of class profiles provides a frequency distribution for each method of statistical review (correlation, standard deviation, p-value difference, extreme p-values, and isolated ranges). The frequency distribution helps to identify those classes with test response patterns that are distinctly different from the norm or the most frequently observed patterns.

The following review presumes that fair, accurate test administration is the most common condition among the classes reviewed and, therefore, that the review should concentrate on patterns that deviated from the established norm. Test response patterns that occur no more frequently than 2.5% of the time are considered clearly outside the norm. Patterns that occur within the range of 85% of all other classes are considered to be within the norm. To classify all classes for further review a value of 0 to 3 is assigned to each class for each method of analysis (e.g., Tests 1–7 above), as follows:

| Irregularity Level | Analysis Result With Respect to All Classes |
| --- | --- |
| 0 | Within the range represented by 85% of all classes |
| 1 | Equal to or greater than 85%, but less than 92.5% |
| 2 | Equal to or greater than 92.5%, but less than 97.5% |
| 3 | Equal to or greater than 97.5% |

The normative analysis also demonstrates that several of the methods of analysis are sensitive to the scoring level of the class. The p-value profile tends to flatten at higher and lower scoring levels and therefore will not provide as high correlation coefficients as with classes scoring in the mid-range. This is also true of the standard deviation and p-value difference methods of review. The extreme p-value analysis is based on class performance relative to other classes at the same scoring level, and the result therefore incorporates scoring level. The isolated range analysis reports on extreme variations within the class and is therefore free from scoring level effects.

P-Value Profile Inspection and Inspection Scores

In one application of the methods described above, the majority of irregular p-value patterns fell into one of three categories: (1) extended range between easy and difficult item p-values; (2) reduced range between easy and difficult item p-values; and (3) elevated p-values at an isolated test section. Each category has a distinctive characteristic effect on the class p-value profile. Isolated classes, however, have p-value profiles that do not fit any of these models. These classes either combine several methods of influencing test performance or, apparently, randomly apply the influence. Nevertheless, these profiles result in statistically significant conflict with the characteristics of natural skill when expressed without improper influence.

The p-value profiles of classes with irregular response pattern parameters have been individually reviewed. This inspection review considered a number of elements presented by the profile: the degree of consistency in the pattern, both in the range of p-values and the relationship with the established item difficulty levels; the nature of any contradictions present and the likelihood of the contradictions arising from a statistical artifact; and the pattern of contradictions that would be consistent with purposeful interference. The inspection review considered the class size and the effect of the performance of one or a few students on any irregularity found to be present.

The inspection review was formalized into an Inspection Score ranging from 0 to 5, where 0 indicated no apparent conflict with the natural skill development expected from the test content, where 1 indicated a first level of concern that could yet be due to a statistical anomaly, and where 5 indicated an entire fabrication of test responses, entirely in conflict with the expected skill based response patterns.

Statistical Irregular Response Pattern (IRP) Scores

Each method of response pattern review yields an Irregularity Level of 0 to 3, as explained above. Classes with an assigned Level of 3 are considered to be significantly more problematical that those at Level 1. Classes with assigned Irregularity Levels for multiple review methods are considered more problematical than those with only a single irregular result. An initial attempt at reviewing the frequency of classes with multiple Irregularity Levels was facilitated by simply adding all the Irregularity Level values to provide a Statistical Irregularity Score. This method demonstrated both the relative rarity of multiple, high level Irregularity Levels for any one class and the grossly irregular character of those few classes that did turn up. Clearly, classes with multiple indications of problems were more serious, but a simple additive procedure may not provide the best identification. One method to evaluate the relative contribution of each form of review is to lit perform a multiple regression of all the Statistical Irregularity Scores against the Inspection Scores. This regression provides a weighting for each review method in the explanation of the range of Inspection Scores. In circumstances where one or more forms of improper test administration are particularly prevalent or absent, it would be expected that different review methods would play a greater or lesser role in explaining the Inspection Scores. In one such analysis, each one of the different review methods provided a significant contribution to explaining the range of Inspection Scores.

The beta weights of the regression analysis were then used to create a new Statistical Score with a range from 0 to 10.

Both the Statistical Score and the Inspection Score agree on the most profoundly irregular class response patterns and have substantial agreement at the mid-score range.

SPECIFIC EXAMPLES

One preferred embodiment of this invention implements the techniques described above using a digital computer that is programmed to generate class p-value profiles and several normative p-value profiles, and then to identify class p-value profiles that deviate excessively from one or more of the normative profiles. The following description of this embodiment will utilize the following notation:

n=number, count ns=number of subjects ni=number of test items (number of questions)

s=a subject i=a test question or an item r=a response to an item rc=a correct response to an item j=a class or group of subjects k=a level on the characteristic measured by the test (i.e. skill, ability)

kj=a level k which includes the subjects of group j $n_{(rj, i)}$=number of subjects in group j who respond to item I $n_{(rcj, i)}$=number of subjects in group j who correctly respond to item I $PV_{(i)}$=Normative p-value: Percent of all subjects who correctly respond to item i $PV_{(j, i)}$=Group p-value: Percent of subjects in group j who correctly respond to item i $PV_{(k, i)}$=Level p-value: Percent of subjects in groups at level k who correctly respond to item i σ=Standard deviation of a group of values Turning to FIGS. 21 and 22, first a class p-value profile is calculated for each of the classes being evaluated, as shown in block 10. Throughout this specification and the following terms, the term "class" is intended broadly to refer to the individuals who have taken a standardized test under the administration of a single test administrator such as a teacher or a test proctor. Thus, the individuals of a class may or may not have studied together prior to the time they took the test. Similarly, the term "student" refers to an individual taking a group-administered test, whether or not the individual is enrolled in a program of study.

Figure 22:
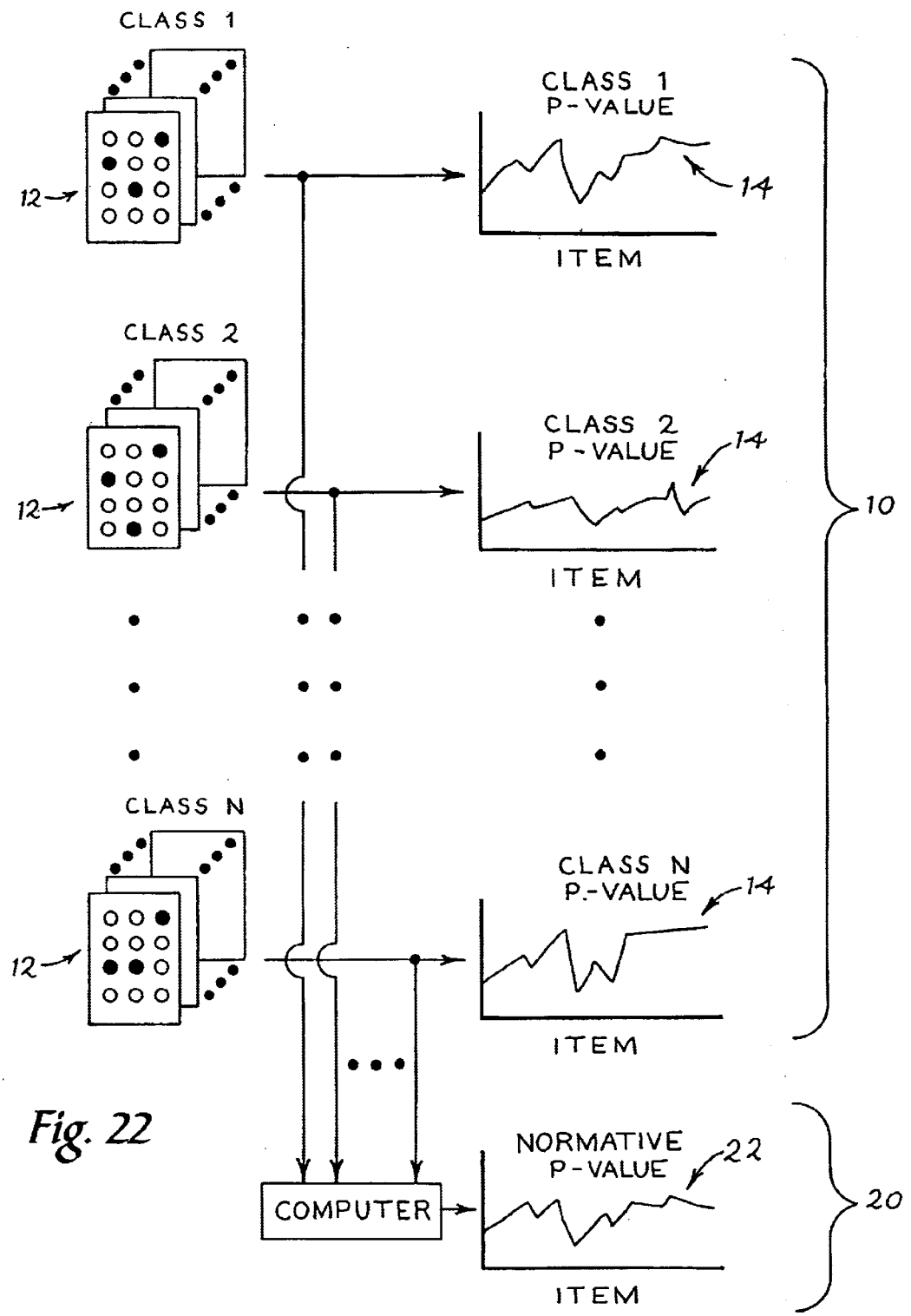
FIG. 22 is a schematic diagram illustrating selected portions of the method of FIG. 21.

Typically, each individual prepares an answer sheet 12 as shown in FIG. 22, and a class of 20 individuals will therefore generate 20 answer sheets 12. Each answer sheet 12 will in some way indicate the selected answer for each of a number of questions. Generally, the questions are multiple-choice questions, and often the answer sheets 12 are so-called bubble sheets, in which an individual selects one of several answers for one or more questions by darkening the corresponding regions of the answer sheet with a pencil.

In this example, each class p-value profile takes the form shown at 14, which plots the percent of subjects in the class which correctly respond to each item. Thus, in this example the class p-value profiles are determined as follows:

$$PV_{(j,i)} = \frac{n_{(rcj,i)}}{n_{(rj,i)}}$$

Each class profile indicates, for the class as a whole, the success of the individuals of the class on a question by question basis in correctly answering the questions of the test.

While the term "p-value" typically refers to the percent of class members who correctly respond to a specific test item, our intent is to use it to represent the content of the item relative to the characteristic (skill, ability, a knowledge) measured by the test. As used herein, the term "p-value" is not limited to the percent correct, and many other approaches can be used for calculating the test characteristic content of the item. For example, various item characteristics as developed in item response theory (IRT) can be used, including item discrimination ($a_i$), item difficulty ($b_i$), and a guessing parameter ($c_i$). IRT provides a formula for combining these measurements to estimate the likelihood of a correct response to the item among individuals with a skill level of theta:

$$P_i(\theta) = c_i + \frac{1-c_i}{[1+\{-Da_i(\theta-b_i)\}]}.$$

In this formula, D is a scaling constant usually set equal to 1.7. (See, Drasgow F. & Guertler, E. (1987). *A Decision-Theoretic Approach to the Use of Appropriateness Measurement for Detecting Invalid Test and Scale Scores. Journal of Applied Psychology*, American Psychological Association, Inc. p11) The IRT formula has been developed to be applied to individual test-taker responses, not to class profiles. Nevertheless, it is anticipated that this formula will be useful in assessing class responses as well. This is simply one example of the various approaches that can be used to generate alternatives to the traditional p-values.

Referring again to FIGS. 21 and 22, next a normative p-value profile 22 is generated at 20. This normative p-value profile 22 may be equal to the average class profile for all of the classes that have taken the test in question, or alternately for only those classes that have a desired skill level, i.e., those classes that achieve a certain range of correct answers on the test.

Figure 21:
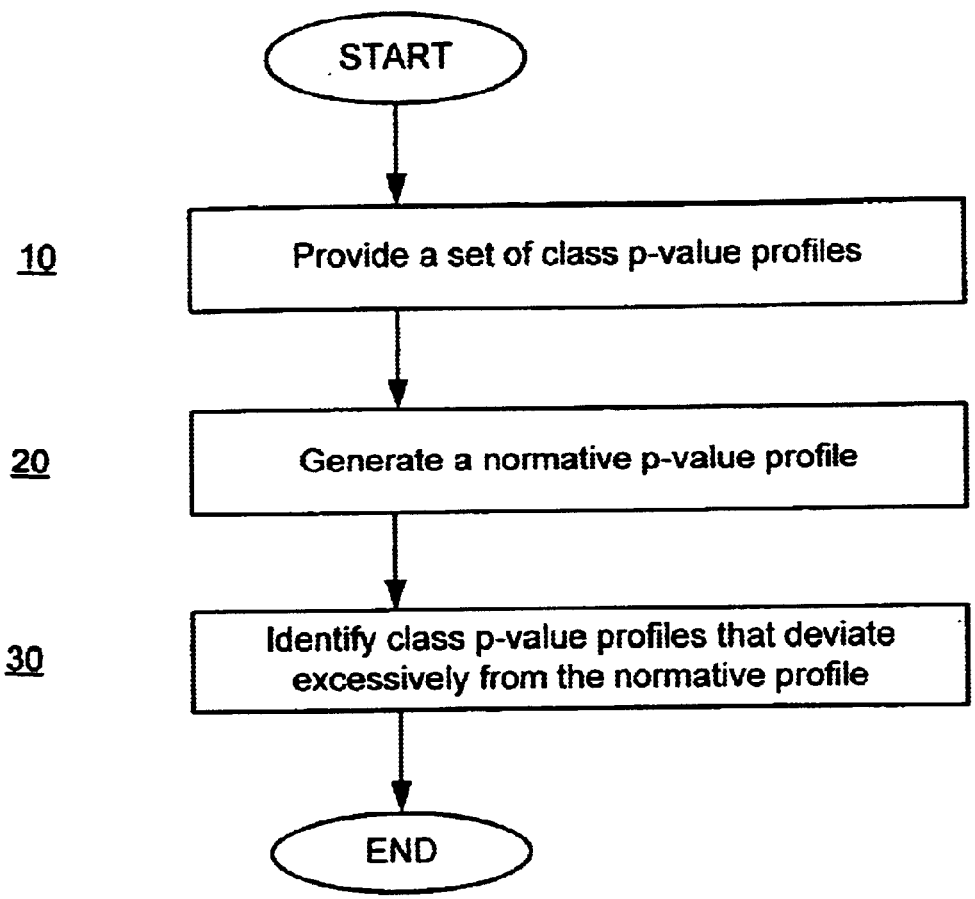
FIG. 21 is a flow chart of a method implemented by a presently preferred embodiment of this invention.

Next, at block 30 of FIG. 21, class profiles that deviate excessively from the normative profile are identified to evaluate test administration. As explained above, many different approaches can be used to identify excessive deviation of this type. The following sections provide specific examples for five separate tests that have been found useful (corresponding to Tests 1, 3, 4, 5 and 6 of the foregoing general discussion).

Pearson Linear Correlation (Test 1)

This test assesses the Pearson linear correlation for each class profile as compared with the normative profile for classes of a comparable skill level as well as a normative profile for all classes. Using the foregoing notation, this test can be summarized as follows:

For each group j, correlate $PV_{(j,\,i)}$ and $PV_{(j)}$,

For each group j, correlate $PV_{(j,\,i)}$ and $PV_{(k,\,i)}$.

As explained above, the large majority of classes in which tests are properly administered will exhibit class profiles that correlate well with the normative profile for the corresponding skill level and somewhat less well with the normative profile for all classes.

P-value difference (Test 3)

For each class j, determine $$\sum_{\text{selected easy items}} (PV_{(j,i)})/ni - \sum_{\text{selected hard items}} (PV_{(j,i)})/ni.$$

In this test, the average class p-value for selected hard questions is subtracted from the average class p-value for selected easy questions, and this parameter is compared with the corresponding parameter for the normative profile for classes of a comparable skill level. As explained above, unusually high or unusually low values of this parameter are indicative of test misadministration.

Extreme Test Question P-Values (Test 4)

In this test, for each class j and each question i, the following parameter is calculated:

$$\frac{PV_{(j,i)} - PV_{(k,i)}}{\sigma_{(k,j,i)}}.$$

This parameter indicates how many standard deviations separate the p-value for a particular class and question from the average p-value for students of a comparable skill level and the same question. A large number of items with a high value on this parameter is indicative of misadministration of the test.

Isolated Range of Exceptional Performance (Test 5)

In this test, each class profile is used to determine the difference between the maximum and minimum values of the following parameter:

$$\sum_{\substack{10 \text{ successive} \\ \text{question}}} (PV_{(j,i)} - PV_{(k,i)}),$$

for various sets of 10 successive questions.

An unusually large value for this parameter indicates that students in the respective class did unusually well or unusually poorly on a part of a test as compared to the normative profile. This suggests that the corresponding section of the test was not administered properly.

Successive Equal P Values (Test 6)

In this test, for each for each class j and all values of i, the number of times where the p-values are successively equal to one another are determined. For example, the instances of the following identities are determined, for all values of i:

$PV_{(j,i)} = PV_{(j,i+1)}$, $PV_{(j,i)} = PV_{(j,i+1)} = PV_{(j,i+2)}$, $PV_{(j,i)} = PV_{(j,i+1)} = PV_{(j,i+2)} = PV_{(j,i+3)}$.

As explained above, a string of constant p-values for a class as a whole is indicative of test misadministration.

Unintentional Errors in Test Administration

The evaluation techniques described above are also well-suited to identifying unintentional errors in test administration. A standardized test provides an optimum measure of student performance when it is administered in a reliable, standardized manner. The techniques described above are well-suited to determining whether or not this was, in fact, the case for any particular class.

For example, if the test administrator does not settle the class properly prior to beginning the test, the p-value profile for the class often shows unexpectedly low performance relative to the citywide average p-value profile for the initial questions of the test. Similarly, a precipitous drop in student performance in one test section for a given class may indicate that the test administrator hurried the students along in that section of the test to encourage the students to finish the test on time. A precipitous drop in student performance for a particular class at the end of a time-restricted test, particularly when nearly all students complete the test, is an indication that random guessing was encouraged by the test administrator near the end of the test. Another indication that random guessing was encouraged near the end of the allotted time is when all students complete the test but the expected skill-related item variation all but disappears. When all students in a modest skill-level class complete the test but skill-related item variation is retained, this is a suggestion that additional time has been provided to allow slower students to complete the test.

Test Administration Errors for Sub-groups Other than Classes

The methods described above are not limited to the situation where each sub-group is made up of individuals taking a standardized test at the same time; under the control of the same test administrator. Though this is an important application for the methods described above, these methods are also useful in situations where the same standardized test is administered to many subjects, one at a time. For example, a test administrator may proctor a standardized test to many home-bound students, one at a time. The test results generated by these home-bound students may be cumulated to form a sub-group, and the sub-group profile may be analyzed as described above to detect problems in test administration.

Also, while the methods described above are extremely effective in determining test misadministration by a particular test administrator, these techniques can also be used to examine the influence of other factors common to a particular sub-group. For example, all classes at a school may be classified as a sub-group, and then the techniques described above can be used to evaluate the potential influence of the school administrator on standardized test results. In another example, it was found that students attending a privately-operated, independent reading class were instructed on the content of a public school standardized test. In this case, all of the students attending the independent reading class can be classified as a sub-group, regardless of the test administrator for the standardized test, to allow the effects of the external influence (the independent reading class) to be evaluated using the techniques described above.

As used herein, the term "sub-group profile" is intended broadly to encompass any desired sub-group of the total group of individuals taking a standardized test, including all of the examples described above. In these examples, administration of the selected test is evaluated based on a comparison of each of the sub-group profiles with a normative profile on a question-by-question basis. In this connection, the term "administration of a test" is intended broadly to encompass any external influence on test administration, including for example the specific external influences described above. Thus, administration of a test encompasses many factors beyond the specific manner in which a test administrator administers a group-administered test.

Best Mode Details

Applicant has enclosed a microfiche appendix describing a preferred computer program for implementing the present invention. This appendix is intended by way of illustration, and it is not intended to limit the scope of the following claims.

CONCLUDING REMARKS

It should be apparent from the foregoing that an improved method and system have been described for detecting when a standardized test is not administered properly. It is anticipated that this method will provide great advantages in assessing the reliability of standardized test scores and in improving the standardization of test administration.

Of course, many changes and modifications can be made to the preferred embodiments described above. Any suitable computer can be programmed using any suitable computer language to implement the functions described above, and selected steps of the method can be performed manually. The various comparisons between the sub-group p-value profiles and the normative p-value profiles may be used in any desired sub-combination. For example, in some embodiments only a single one, or any two, or any three of these comparisons may be used. Other comparisons may be substituted or used in combination with the comparisons described above.

It is therefore intended that the foregoing detailed description be regarded as illustrative rather than limiting, and that it be understood that it is the following claims, including all equivalents, that are intended to define the scope of this invention.

I claim:

1. A method for evaluating group-administered test results, said method comprising:
   (a) providing a set of class profiles by test administrator, each class profile indicative of the question by question performance of a respective class on a selected group-administered test comprising a plurality of questions which are directed to measure the same characteristic;
   (b) generating with a computer a normative profile indicate of normative class performance on the selected test, where the members of each class included in the normative profile are subject to the direction of the same test administrator on the selected test;
   (c) comparing each of the class profiles with the normative profile on a question-by-question basis; and
   (d) generating a measure of the question by question variation of each of the class profiles from the normative profile.

2. The method of claim 1 wherein act (c) comprises identifying selected ones of the class profiles that are characterized by a low correlation with the normative profile.

3. The method of claim 1 wherein act (c) comprises comparing (1) at least two portions of each class profile that differ in question difficulty against (2) corresponding portions of the normative profile.

4. The method of claim 1 wherein act (c) comprises comparing (1) a difference between at least a portion of each of the class profiles and a corresponding portion of the normative profile on a question-by-question basis; and (2) a measure of expected variability of class performance for the corresponding portion of the class profiles.

5. The method of claim 1 wherein act (c) comprises comparing (1) a measure of difference between a first portion of each of the class profiles and a corresponding first portion of the normative profile and (2) a measure of difference between a second portion of each of the class profiles and a corresponding second portion of the normative profile.

6. The method of claim 1 wherein act (c) comprises comparing the frequency of successive equal measures of class success in answering the questions on a question-by-question basis.

7. A method for evaluating group-administered test results, said method comprising:
   (a) providing a set of class profiles by test administrator, each class profile indicative of the question by question performance of a respective class on a selected group-administered test comprising a plurality of questions which are directed to measure the same characteristic;
   (b) generating with a computer a normative profile indicative of normative class performance on the selected test where the members of each class included in the normative profile are subject to the direction of the same test administrator on the selected test;
   (c) generating a measure of the question by question variation of each of the class profiles from the normative profile; and
   (d) identifying individual ones of the class profiles that deviate excessively from the normative profile on a question-by-question basis.

8. The method of claim 7 wherein act (d) comprises identifying selected ones of the class profiles that are characterized by a low correlation with the normative profile.

9. The method of claim 7 wherein act (d) comprises comparing (1) at least two portions of each class profile that differ in question difficulty against (2) corresponding portions of the normative profile.

10. The method of claim 7 wherein act (d) comprises comparing (1) a difference between at least a portion of each of the class profiles and a corresponding portion of the normative profile on a question-by-question basis; and (2) a measure of expected variability of class performance for the corresponding portion of the class profiles.

11. The method of claim 7 wherein act (d) comprises comparing (1) a measure of difference between a first portion of each of the class profiles and a corresponding first portion of the normative profile and (2) a measure of difference between a second portion of each of the class profiles and a corresponding second portion of the normative profile.

12. The method of claim 7 wherein act (d) comprises comparing the frequency of successive equal measures of class success in answering the questions on a question-by-question basis.

13. The method of claim 1 or 7 wherein act (a) comprises:
   (a1) providing a respective individual profile for each of a plurality of individuals that took the group-administered test, each individual associated with a respective one of the classes, each individual profile indicative of accuracy of the respective individual in answering the plurality of questions on a question-by-question basis; and
   (a2) determining each class profile from the individual profiles of the individuals in the respective class, each class profile indicative of accuracy of the individuals in the respective class in answering the questions on a question-by-question basis.

14. The method of claim 1 or 7 wherein the class profiles of (a) are each characterized by a skill level, and wherein the normative profile of (b) is indicative of expected class performance for a class of said skill level.

15. The method of claim 1 or 7 wherein the normative profile of (b) is indicative of expected class performance for classes of a wide range of skill levels.

16. A method for evaluating standardized test results, said method comprising:
   (a) providing a set of sub-group profiles, each sub-group comprising a plurality of individuals whose test question responses are exposed to a common element affecting test administration and each sub-group profile indicative of the question by question performance of a respective sub-group on a selected standardized test comprising a plurality of questions which are directed to measure the same characteristic;
   (b) generating with a computer a normative profile indicative of normative sub-group performance on the selected test; and
   (c) evaluating administration of the selected test based on a comparison of each of the sub-group profiles from the normative profile on a question-by-question basis.

17. The method of claim 16 wherein each sub-group comprises individuals to whom the selected test was administrated by a respective test administrator in a respective testing session.

18. The method of claim 16 or 17 wherein act (c) comprises identifying selected ones of the sub-group profiles that are characterized by a low correlation with the normative profile.

19. The method of claim 16 or 17 wherein act (c) comprises comparing (1) at least two portions of each sub-group profile that differ in question difficulty against (2) corresponding portions of the normative profile.

20. The method of claim 16 or 17 wherein act (c) comprising comparing (1) a difference between at least a portion of each of the sub-group profiles and a corresponding portion of the normative profile on a question-by-question basis; and (2) a measure of expected variability of sub-group performance for the corresponding portion of the sub-group profiles.

21. The method of claim 16 or 17 wherein act (c) comprises comparing (1) a measure of difference between a first portion of each of the sub-group profiles and a corresponding first portion of the normative profile and (2) a measure of difference between a second portion of each of the sub-group profiles and a corresponding second portion of the normative profile.

22. The method of claim 16 or 17 wherein act (c) comprises comparing the frequency of successive equal measures of class success in answering the questions on a question-by-question basis.

23. The method of claim 16 or 17 wherein act (a) comprises:
   (a1) providing a respective individual profile for each of a plurality of individuals that took the standardized test each individual associated with a respective one of the sub-groups, each individual profile indicative of accuracy of the respective individual in answering the plurality of questions on a question-by-question basis; and
   (a2) determining each sub-group profile from the individual profiles of the individuals in the respective sub-group, each sub group profile indicative of accuracy of the individuals in the respective sub-group in answering the questions on a question-by-question basis.

24. The method claim 16 or 17 wherein the sub-group profiles of (a) are each character by a skill level, and wherein the normative profile of (b) is indicative of expected sub-group performance for a sub-group of said skill level.

25. The method of claim 16 or 17 wherein the normative profile of (b) is indicative of expected sub-group performance for sub-groups of a wide range of skill levels.

* * * * *

UNITED STATES PATENT AND TRADEMARK OFFICE
CERTIFICATE OF CORRECTION

PATENT NO. : 6,960,088 B1 Page 1 of 1
APPLICATION NO. : 09/649484
DATED : November 1, 2005
INVENTOR(S) : Eliot R. Long It is certified that error appears in the above-identified patent and that said Letters Patent is hereby corrected as shown below:

In the Claims

Column 16, in claim 23, line 4, immediately after "the standardized test" insert --,-- (comma).

Signed and Sealed this

Twelfth Day of December, 2006

JON W. DUDAS
*Director of the United States Patent and Trademark Office*